United States Patent
Filsfils et al.

(10) Patent No.: US 12,513,072 B2
(45) Date of Patent: Dec. 30, 2025

(54) HARDWARE ACCELERATED PATH TRACING ANALYTICS

(71) Applicant: Cisco Technology, Inc., San Jose, CA (US)

(72) Inventors: Clarence Filsfils, Brussels (BE); Pablo Camarillo Garvia, Madrid (ES); Ahmed Mohamed Ahmed Abdelsalam, L'Aquila (IT); Sonia Ben Ayed, Ile-de-France (FR); Jisu Bhattacharya, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 18/227,602

(22) Filed: Jul. 28, 2023

(65) Prior Publication Data

US 2024/0297838 A1   Sep. 5, 2024

Related U.S. Application Data

(60) Provisional application No. 63/449,801, filed on Mar. 3, 2023, provisional application No. 63/449,816, filed on Mar. 3, 2023.

(51) Int. Cl.
*H04L 43/106* (2022.01)
*H04L 43/0852* (2022.01)
*H04L 43/12* (2022.01)

(52) U.S. Cl.
CPC ........ *H04L 43/106* (2013.01); *H04L 43/0852* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 11,621,853 B1* | 4/2023 | Mao | H04L 63/00 713/176 |
| 2016/0277272 A1* | 9/2016 | Peach | H04L 43/0858 |
| 2020/0099611 A1 | 3/2020 | Filsfils et al. | |
| 2020/0322270 A1 | 10/2020 | Xiao et al. | |
| 2021/0144082 A1 | 5/2021 | Bisht et al. | |

(Continued)

OTHER PUBLICATIONS

Brockners, et al, "Requirements for In-situ OAM", Internet Engineering Task Force, Mar. 13, 2017, pp. 1-24.

(Continued)

*Primary Examiner* — Angela Nguyen
(74) *Attorney, Agent, or Firm* — Lee & Hayes, P.C.

(57) ABSTRACT

Techniques for processing path tracing probe packets using hardware (e.g., hardware memory of a node) and without the involvement of a path tracing collector component of a network controller. A source node may be configured to generate and assign random flow labels to a large number of probe packets and send them through the network to a sink node. The sink node may determine whether a flow indicated by the probe packet has previously been traversed. Additionally, the sink node may determine latency values associated with the flows, and store probe packets in corresponding latency bins. The latency bins may be stored in hardware memory of the sink node. Telemetry data representing the probe packets stored in the latency bins may be sent to a network controller for further network analysis.

20 Claims, 16 Drawing Sheets

(56) References Cited

U.S. PATENT DOCUMENTS

| | | |
|---|---|---|
| 2022/0173992 A1 | 6/2022 | Filsfils et al. |
| 2022/0262062 A1 | 8/2022 | Raposo Subtil et al. |
| 2022/0407800 A1 | 12/2022 | Chadha |
| 2023/0031423 A1 | 2/2023 | Gandhi et al. |
| 2023/0091734 A1* | 3/2023 | Reddy ................ H04L 43/0841 370/252 |

OTHER PUBLICATIONS

Search Report and Written Opinion for International Application No. PCT/US2024/018056, Dated Jun. 21, 2024, 16 pages.

\* cited by examiner

```
900 ─┐
```

SEND, FROM A NETWORK CONTROLLER ASSOCIATED WITH A NETWORK AND TO A FIRST NODE OF THE NETWORK, AN INSTRUCTION TO SEND FIRST PROBE PACKETS FROM THE FIRST NODE AND TO AT LEAST A SECOND NODE OF THE NETWORK
902

↓

RECEIVE, AT THE NETWORK CONTROLLER AND FROM THE FIRST NODE, A FIRST COUNTER INDICATING A FIRST NUMBER OF THE FIRST PROBE PACKETS
904

↓

RECEIVE, AT THE NETWORK CONTROLLER AND FROM THE SECOND NODE, A SECOND COUNTER INDICATING A SECOND NUMBER OF SECOND PROBE PACKETS THAT THE SECOND NODE STORED IN ONE OR MORE BINS OF A DATABASE ASSOCIATED WITH THE SECOND NODE
906

↓

DETERMINE, BY THE NETWORK CONTROLLER, A PACKET LOSS ASSOCIATED WITH FLOWS IN THE NETWORK BASED AT LEAST IN PART ON THE FIRST COUNTER AND THE SECOND COUNTER
908

↓

DETERMINE, BY THE NETWORK CONTROLLER, A LATENCY DISTRIBUTION ASSOCIATED WITH THE FLOWS IN THE NETWORK BASED AT LEAST IN PART ON THE ONE OR MORE BINS THAT THE SECOND PROBE PACKETS ARE STORED IN
910

↓

STORE, BY THE NETWORK CONTROLLER AND IN THE DATABASE, THE PACKET LOSS AND THE LATENCY DISTRIBUTION IN ASSOCIATION WITH THE FLOWS IN THE NETWORK
912

FIG. 9

HARDWARE ACCELERATED PATH TRACING ANALYTICS

CROSS REFERENCE TO RELATED APPLICATIONS

This application claims priority to U.S. Provisional Patent Application No. 63/449,801, filed Mar. 3, 2023, and U.S. Provisional Patent Application No. 63/449,816, filed Mar. 3, 2023, the entire contents of which are incorporated herein by reference.

TECHNICAL FIELD

The present disclosure relates generally to improved network path tracing and delay measurement techniques.

BACKGROUND

Path tracing solutions and data plane monitoring techniques can provide network operators with improved visibility into their underlying networks. These solutions collect, from one or more nodes along the path of a traffic flow, various information associated with the nodes, such as device identifiers, port identifiers, etc. as packets traverse through them. The collected information can travel with the packet as telemetry data while the packet traverses the network and can be used to determine the actual path through the network taken by the packet. That is, path tracing solutions may provide a record of the traffic flow as a sequence of interface identifiers (IDs). In addition, these solutions may provide a record of end-to-end delay, per-hop delay, and load on each interface along the traffic flow. Path tracing is currently implemented at line-rate in the base pipeline across several different application specific integrated circuits (ASICs).

Path tracing minimizes the hardware complexity by utilizing a data plane design that collects only 3 bytes of information from each midpoint node on the packet path (also referred to herein as a flow). That is, a path tracing source node generates probe packets, sends the probe packets toward a sink node to measure the different ECMP paths between the source node and the sink node, and once those packets traverse the network, they are encapsulated and forwarded to an analytics controller where the information collected along the packet delivery path is processed. These 3 bytes of information is called midpoint compressed data (MCD) which encodes the outgoing interface ID (12 bits), the time at which the packet is being forwarded (8 bits), and the load (4 bits) of the interface that forwards the packet. On top of the minimized hardware complexity, path tracing leverages software-defined networking (SDN) analytics. That is, the hardware performs the bare minimum functionality (e.g., only collecting the information), and the usage of an SDN application running on commodity compute nodes is leveraged for the analytics. In short, path tracing is a hardware and network operating system (NOS) feature that is paired with an SDN analytical tool. That analytics leverage the accurate data collected by path tracing to solve many use-cases arising in customer networks, including equal-cost multipath (ECMP) analytics (e.g., blackholing paths, wrong paths, per-ECMP delay, etc.), network function virtualization (NFV) chain proof of transit, delay measurements, jitter measurements, and the like.

However, for some ASICs, some of the path tracing headers in the path tracing probe packet (e.g., an SRH PT-TLV or an IPV6 Destination Options header) may be too deep in the packet (e.g., outside of an edit-depth/horizon of a given packet). This is problematic because such a header may be configured to carry a 64-bit timestamp (e.g., a precision time protocol (PTP) transmission timestamp) of the source node, which, as previously mentioned, may be too deep in the packet for a given ASIC to edit. Specifically, in cases when a long segment ID (SID) list is required (e.g., in segment routing version 6 (SRv6) traffic engineering), or a large path tracing hop-by-hop (PT HbH) header is added to the probe packet, which pushes the header, where the 64-bit timestamp is recorded, deeper in the packet. Additionally, or alternatively, some ASICs may not have access to the full 64-bit timestamp. For example, some ASICs have access only to the portion representing nanoseconds (e.g., the 32 least significant bits) of the PTP timestamp. This requires the need to retrieve the portion representing the seconds (e.g., the 32 most significant bits) of the PTP timestamp from another source.

Further, while the network controller is configured to receive and process millions of probe packets forwarded by many sink nodes, it is by far the most computationally expensive entity in path tracing solutions to the operators. This introduces performance bottlenecks and results in the computing cost of the CPU cores processing the probe packets to be relatively high. Thus, there is a need to perform path tracing analytics at scale and at a lower cost.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example method for a network controller associated with a network to send an instruction to a source node to begin a path tracing sequence associated with flows in the network, determine a packet loss associated with the flows in the network, determine a latency distribution associated with the flows in the network, and store the packet loss and latency distribution in association with the flows.

DESCRIPTION OF EXAMPLE EMBODIMENTS

Overview

Figure 1:
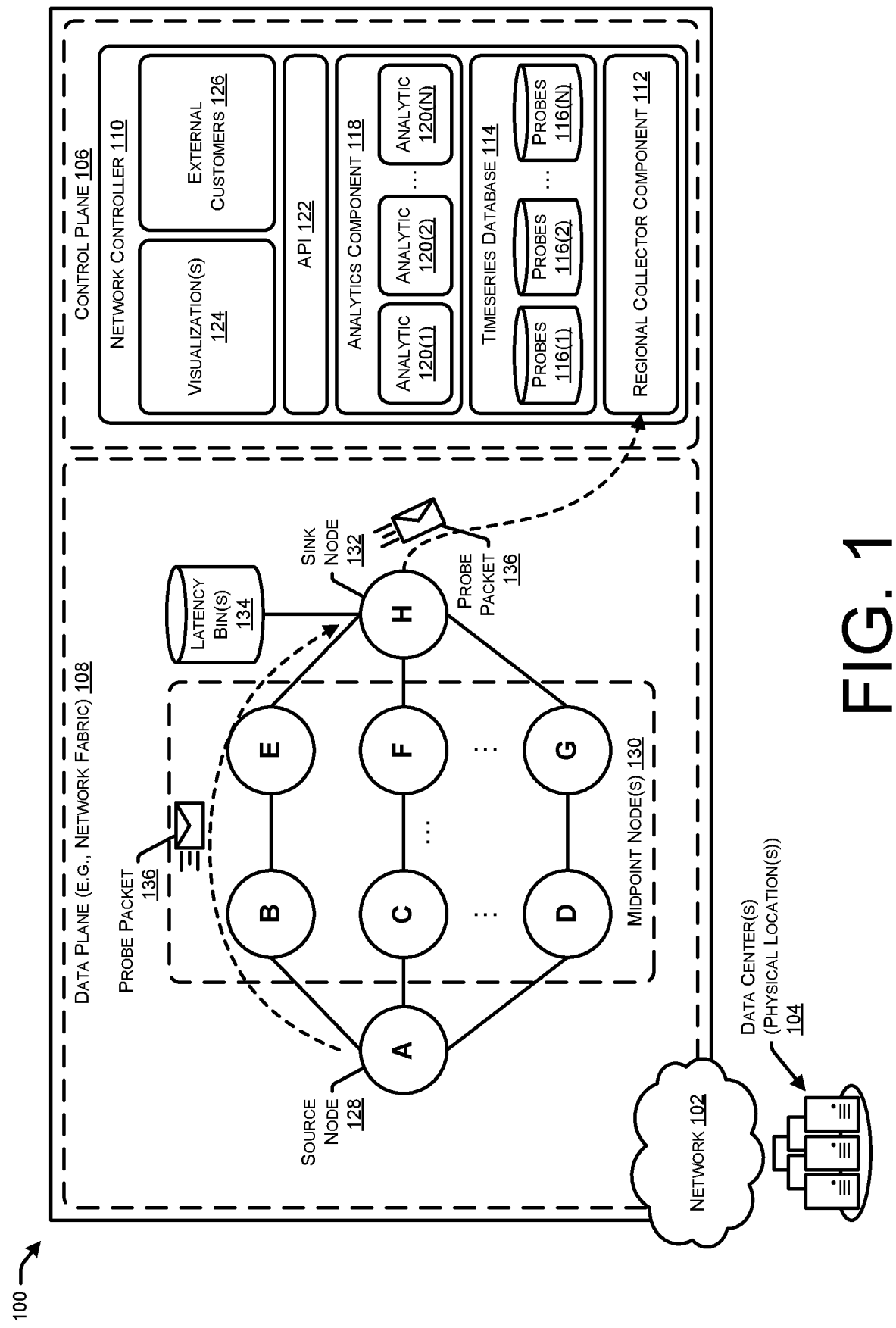
FIG. 1 illustrates a schematic view of an example system architecture of a network for implementing various path tracing technologies described herein using a source node, one or more midpoint node(s), a sink node, and/or a network controller associated with the network.

This disclosure describes systems and methods that, among other things, improve technologies related to network path tracing and network delay measurements. By way of example, and not limitation, a method according to the various techniques described in this disclosure may include receiving, at a first node of a network, an instruction that a probe packet is to be sent to at least a second node of the network. Additionally, or alternatively, the method includes generating the probe packet by the first node of the network. In some examples, the probe packet may comprise a first header at a first depth in the probe packet. Additionally, or alternatively, the probe packet may comprise a second header at a second depth in the probe packet. In some examples, the second depth may be deeper in the probe packet than the first depth. Additionally, or alternatively the method includes generating, by the first node, first timestamp data including a first full timestamp indicative of a first time at which the first node handled the probe packet. Additionally, or alternatively, the method includes appending, by the first node and to the second header of the probe packet, the first full timestamp. Additionally, or alternatively, the method includes determining, by the first node, first telemetry data associated with the first node. In some examples, the first telemetry data may comprise a short timestamp representing a portion of a second full timestamp that is indicative of a second time at which the first node handled the probe packet. In some examples, the second time may be subsequent to the first time. Additionally, or alternatively, the first telemetry data may comprise an interface identifier associated with the first node. Additionally, or alternatively, the first telemetry data may comprise an interface load associated with the first node. Additionally, or alternatively, the method includes appending, by the first node and to a stack of telemetry data in the first header of the probe packet, the first telemetry data. Additionally, or alternatively, the method includes sending the probe packet from the first node and to at least the second node of the network.

Additionally, or alternatively, the method may include storing, by a network controller associated with a network, a lookup table indicating nodes in the network having a specific capability. Additionally, or alternatively, the method may include receiving, at the network controller, a probe packet that has been sent through the network from a first node and to a second node. In some examples, the probe packet may include a first header at a first depth in the probe packet. Additionally, or alternatively, the first header may include a first full timestamp indicative of a first time at which the first node handled the probe packet. Additionally, or alternatively, the probe packet may include a second header at a second depth in the probe packet that is shallower than the first depth. In some examples, the second header may include at least first telemetry data comprising a short timestamp representing a first portion of a second full timestamp indicative of a second time at which the first node handled the probe packet. In some examples, the second time may be subsequent to the first time. Additionally, or alternatively, the method may include identifying, by the network controller and based at least in part on the probe packet, the first node from among the nodes in the lookup table. Additionally, or alternatively, the method may include generating first telemetry data associated with the first node based at least in part on processing the first telemetry data. Additionally, or alternatively, the method may include determining a third full timestamp associated with the first node based at least in part on appending the first portion of the second full timestamp to a second portion of the first full timestamp. Additionally, or alternatively, the method may include Additionally, or alternatively, the method may include storing, by the network controller and in a database associated with the network, the third full timestamp and the first telemetry data in association with the first node.

Additionally, or alternatively, the method may include maintaining, at a first node of a network, a flow table comprising hashes of flows from a second node of the network through the network to the first node of the network. Additionally, or alternatively, the method may include receiving, at the first node, a first probe packet comprising a first header indicating at least a first flow through the network. Additionally, or alternatively, the method may include generating, by the first node, a first vector representation of the first flow. Additionally, or alternatively, the method may include determining, by the first node, a first hash representing the first vector representation. Additionally, or alternatively, the method may include determining, by the first node and based at least in part on querying the flow table for the first hash, that the first flow is absent from the flow table. Additionally, or alternatively, the method may include adding, by the first node and based at least in part on determining that the first flow is absent from the flow table, the first flow to the flow table. Additionally, or alternatively, the method may include sending, from the first node and to a network controller associated with the network, the first probe packet in association with the first flow.

Additionally, or alternatively, the method may include sending, from a network controller associated with a network and to a first node of the network, an instruction to send first probe packets from the first node and to at least a second node of the network. Additionally, or alternatively, the method may include receiving, at the network controller and from the first node, a first counter indicating a first number of the first probe packets. Additionally, or alternatively, the method may include receiving, at the network controller and from the second node, a second counter indicating a second number of second probe packets that the second node stored in one or more bins of a database associated with the network controller. Additionally, or alternatively, the method may include determining, by the network controller, a packet loss associated with flows in the network based at least in part on the first counter and the second counter. Additionally, or alternatively, the method may include determining, by the network controller, a latency distribution associated with the flows in the network based at least in part on the one or more bins that the second probe packets are stored in. Additionally, or alternatively, the method may include storing, by the network controller and in the database, the packet loss and the latency distribution in association with the flows in the network.

Additionally, or alternatively, the method may include receiving a first probe packet of a path tracing sequence at a first node in a network. Additionally, or alternatively, the method may include determining, by the first node and based at least in part on a first header associated with the first probe packet, a first flow of the first probe packet through the network. Additionally, or alternatively, the method may include determining, by the first node and based at least in part on the first header, a first latency value associated with the first flow. Additionally, or alternatively, the method may include identifying, by the first node and based at least in part on the first flow, a latency database stored in association with a network controller associated with the network. In some examples, the latency database may comprise one or more latency bins representing a latency distribution associated with the network. Additionally, or alternatively, the method may include storing, by the first node, the first flow and the first latency value in a first latency bin of the latency database based at least in part on the first latency value. Additionally, or alternatively, the method may include sending, from the first node and to the network controller, and indication that the path tracing sequence has ceased.

Additionally, the techniques described herein may be performed by a system and/or device having non-transitory computer-readable media storing computer-executable instructions that, when executed by one or more processors, performs the method described above.

Example Embodiments

As discussed above, path tracing solutions and data plane monitoring techniques can provide network operators with improved visibility into their underlying networks. However, for some ASICs, a header (e.g., an SRH PT-TLV and/or a destination options header (DOH)) in a probe packet may be too deep in the packet (e.g., outside of an edit-depth/horizon of a given packet). This is problematic because such a header may be configured to carry a 64-bit timestamp (e.g., a path tracing protocol (PTP) Tx timestamp) of the source node, which, as previously mentioned, may be too deep in the packet for a given ASIC to edit. Specifically, in cases when a long segment ID (SID) list is required (e.g., in segment routing version 6 (SRv6) traffic engineering), or a large hop-by-hop path tracing (HbH-PT) header is added to the probe packet, which pushes the header, where the timestamp is recorded, deeper in the packet. Additionally, or alternatively, some ASICs may not have access to the full 64-bit timestamp. For example, some ASICs have access only to the portion representing nanoseconds (e.g., the 32 least significant bits) of the PTP timestamp. This requires the need to retrieve the portion representing the seconds (e.g., the 32 most significant bits) of the PTP timestamp from another source. Further, while a component of network controller, such as, for example, a path tracing collector, may be configured to receive and process millions of probe packets forwarded by many sink nodes, such configuration is by far the most computationally expensive entity in path tracing solutions to the operators. This introduces performance bottlenecks and results in the computing cost of the CPU cores processing the probe packets to be relatively high. Thus, there is a need to perform path tracing analytics at scale and at a lower cost.

Accordingly, this disclosure is directed to various techniques for improved path tracing and delay measurement solutions. One aspect of the various techniques disclosed herein relates to providing an optimized behavior (also referred to herein as a specific capability) to source node(s) of a path tracing sequence allowing for implementation of path tracing source node behavior on an ASIC with edit-depth limitations and/or on an ASIC that does not have access to the full 64-bit timestamp. That is, this solution allows for the implementation of path tracing source node behavior on an ASIC with edit-depth limitation(s) and/or an ASIC that does not have access to the full 64-bit timestamp. For example, by recording a first portion (e.g., representing the seconds) of the path tracing source node information (e.g., the full 64-bit timestamp) by the CPU in the SRH PT-TLV and/or the DOH of the probe packet, and a second portion (e.g., representing the nanoseconds) of the path tracing source node information (e.g., the full 64-bit timestamp) by the NPU in the HbH-PT header of the probe packet. This is possible given that the CPU has full access to the timestamp and has no limitation on the edit depth, while the HbH-PT header is very shallow in the packet, coming just after the base IPv6 header, meaning the NPU is not restricted in editing this shallower header. Additionally, network controller behavior may be redefined such that the network controller combines information from both the HbH-PT header and the SRH PT-TLV and/or the DOH of the probe packet to construct the path tracing source node information, such as, for example, the full 64-bit timestamp.

As previously described, a path tracing probe packet may carry various information associated with a path tracing sequence and/or the nodes included in a flow of the path tracing sequence. For example, a path tracing probe packet may comprise at least a first header at a first depth in the packet and a second header at a second depth in the packet. In some examples, the first depth in the packet may be shallower than the second depth in the packet. The first header may comprise an HbH-PT header including an MCD stack associated with a path tracing sequence. The second header may comprise the SRH PT-TLV including the full 64-bit transmit timestamp of the source node of a path tracing sequence. Additionally, or alternatively, the second header may comprise the DOH including the full 64-bit transmit timestamp of the source node of a path tracing sequence. In some examples, the MCD stack encodes the outgoing interface ID (12 bits), the load (4 bits) of the interface that forwards the packet, and/or the time at which the packet is being forwarded (8 bits).

A source node including an ASIC with edit-depth limitations and/or on an ASIC that does not have access to the full 64-bit timestamp may be configured with the optimized behavior described herein. For example, the second depth in the packet may be beyond the edit-depth horizon of the ASIC in the source node or the ASIC may not have access to the full 64-bit timestamp. As such, a source node may execute a path tracing sequence in various ways, depending on whether or not the source node comprises the optimized behavior. For example, and not by way of limitation, the source node may begin the path tracing sequence by generating one or more path tracing probe packets. The probe packet may be generated by the CPU of the source node. In some examples, a path tracing probe packet may comprise an IPV6 header, a HbH-PT header, an SRH, SRH PT-TLV, and/or a DOH. From there, the source node may determine whether optimized behavior is enabled. In some examples, indications of the optimized behavior may be distributed from the network controller and to each of the source nodes that require the optimized behavior. For example, telemetry data, collected from nodes and associated with prior execution of path tracing sequences may indicate which source nodes comprise the optimized behavior. Additionally, or alternatively, a network administrator may configure the network controller with information about the source nodes including ASICs that require the optimized behavior. Additionally, or alternatively, the network controller may comprise a database including information about the ASICs in each source node and may determine that a given ASIC requires the optimized behavior. In examples where the source node determines that the optimized behavior is enabled, the CPU of the source node may record a full 64-bit PTP timestamp representing a first time at which the CPU of the source node handled the probe packet (e.g., the time at which the probe packet is generated) in the SRH PT-TLV and/or the DOH of the second header, and the CPU of the source node may inject the probe packet to the NPU of the source node for forwarding. Alternatively, in examples where the source node determines that optimized behavior is not enabled, the CPU of the source node may inject the probe packet to the NPU of the source node for forwarding.

Once the probe packet is injected into the NPU of the source node, the source node may again determine whether optimized behavior is enabled. In examples where the source node determines that the optimized behavior is enabled, the NPU of the source node may compute midpoint compressed data (MCD) associated with the source node. That is, a source node having the optimized behavior may perform operations typically performed by a midpoint node and compute the outgoing interface ID, a short timestamp representing a second time at which the NPU of the source node handled the probe packet (e.g., the time at which the source node computes the MCD), and/or the outgoing interface load. Since the first header is at a first depth that is within the edit-depth horizon of the NPU, the NPU may then record the MCD in the MCD stack of the HbH-PT included in the first header. Alternatively, in examples where the source node determines that the optimized behavior is not enabled, the NPU of the source node may record the full 64-bit PTP timestamp in the SRH PT-TLV and/or the DOH included in the second header. Additionally, or alternatively, the NPU of the source node may record the outgoing interface ID and the outgoing interface load in the SRH PT-TLV and/or the DOH included in the second header.

Additionally, or alternatively, the network controller (also referred to herein as a path tracing controller) may facilitate execution of a path tracing sequence in various ways, depending on whether the source node from which the path tracing sequence originated comprises the optimized behavior. For example, and not by way of limitation, the network controller may identify path tracing nodes with optimized path tracing source node enabled based on telemetry data received from the nodes. In some examples, telemetry data, collected from nodes and associated with prior execution of path tracing sequences may indicate which source nodes comprise the optimized behavior. Additionally, or alternatively, a network administrator may provide telemetry data to the network controller indicating the source nodes in the network comprising the optimized behavior. With the source nodes comprising the optimized behavior identified, the network controller may generate a lookup table with all of the path tracing source nodes having the optimized behavior enabled. The network controller may receive a path tracing probe packet from a sink node of a network. In some examples, the network controller may be configured to maintain path tracing information for various networks received from various sink nodes provisioned across the various networks. The network controller may identify the source node of the probe packet based on a source address field included in an IPV6 header of the probe packet. With the source node identified, the network controller may query the lookup table for the source node. The network controller may then make a determination as to whether the source node comprises the optimized behavior.

In examples where the network controller identifies the source node of the probe packet in the lookup table, the network controller may determine that the source node is optimized. In examples where the network controller determines that the source node is optimized, the network controller may determine the source node path tracing information by leveraging information from the MCD stack (or the portion thereof appended to the MCD stack by the source node) included in HbH-PT in the first header. For example, the network controller may set the source node outgoing interface of the source node path tracing information as the HbH-PT.SRC-MCD.OIF (e.g., the outgoing interface field of the MCD entry associated with the source node from the MCD stack in the HbH-PT header). Additionally, or alternatively, the network controller may set the source node load of the source node path tracing information as the HbH-PT.SRC-MCD.Load (e.g., the load field of the MCD entry associated with the source node from the MCD stack in the HbH-PT header). Additionally, or alternatively, the network controller may determine the source node full timestamp of the source node path tracing information based on the HbH-PT.SRC-MCD.TS (e.g., the short timestamp field of the MCD entry associated with the source node from the MCD stack in the HbH-PT header) and the SRH PT-TLV.T64 (e.g., the 64-bit timestamp included in the SRH PT-TLV of the first header). Additionally, or alternatively, the network controller may determine the source node full timestamp of the source node path tracing information based on the HbH-PT.SRC-MCD.TS (e.g., the short timestamp field of the MCD entry associated with the source node from the MCD stack in the HbH-PT header) and the DOH.T64 (e.g., the 64-bit timestamp included in the DOH of the first header). That is, the network controller may determine the source node full timestamp by leveraging a portion of the 64-bit timestamp representing the first time at which the CPU of the source node generated the probe packet and the short timestamp representing the second time at which the NPU of the source node generated the MCD. In some examples, the network controller may leverage the seconds portion of the 64-bit timestamp (e.g., the first 32 bits) and append the short timestamp representing the nanoseconds portion to generate the source node full timestamp. With the source node path tracing information determined, the network controller may then write the source node path tracing information into a timeseries database managed by the network controller.

In examples where the network controller does not identify the source node in the lookup table, the network controller may determine the source node path tracing information by leveraging information from the SRH PT-TLV and/or DOH. For example, the network controller may set the source node outgoing interface of the source node path tracing information as the SRH PT-TLV.OIF (e.g., the outgoing interface field of the SRH PT-TLV in the second header of the path tracing probe packet). Additionally, or alternatively, the network controller may set the source node load as the SRH PT-TLV.Load (e.g., the outgoing interface load field of the SRH PT-TLV in the second header of the path tracing probe packet). Additionally, or alternatively, the network controller may set the source node full timestamp as the SRH PT-TLV.T64 (e.g., the 64-bit timestamp field of the SRH PT-TLV in the second header of the path tracing probe packet). In some examples, the network controller may set the source node outgoing interface of the source node path tracing information as the DOH.OIF (e.g., the outgoing interface field of the DOH in the second header of the path tracing probe packet), the source node load as the DOH.IF_LD (e.g., the outgoing interface load field of the DOH in the second header of the path tracing probe packet), and/or the source node full timestamp as the DOH.T64 (e.g., the 64-bit timestamp field of the SRH PT-TLV in the second header of the path tracing probe packet). With the source node path tracing information determined, the network controller may then write the source node path tracing information into a timeseries database managed by the network controller.

Take, for example, a network comprised of a data plane (e.g., a network fabric) including a source node, one or more midpoint node(s), and/or a sink node, and a control plane including a network controller. The source node may receive an instruction that a probe packet is to be sent to at least the sink node of the network. That is, the source node may receive an instruction from the network controller to begin a path tracing sequence in the network. In some examples, the source node may receive an instruction that a probe packet is to be to at least a second node of the network (e.g., the sink node). The source node may be configured to generate one or more probe packets. In some examples, a probe packet generated by the source node may include at least a first header at a first depth in the probe packet and/or a second header at a second depth in the probe packet. In some examples, the second depth may be deeper in the packet than the first depth. Additionally, or alternatively, the first header may be configured as a HbH-PT header comprising an MCD stack for carrying telemetry data associated with the node(s) in the network. Additionally, or alternatively, the second header may be configured as a SRH PT-TLV header and/or the DOH.

The source node may also be configured to generate first timestamp data including a first full timestamp (e.g., a PTP transmission 64-bit timestamp) indicative of a first time at which the source node handled the probe packet. In some examples, a CPU of the source node may be configured to generate the first timestamp data. The source node may append the first full timestamp to the second header of the probe packet. Additionally, or alternatively, the source node may be configured to determine first telemetry data associated with the source node. In some examples, an NPU of the source node may be configured to generate the telemetry data. In some examples, the first telemetry data may include a short timestamp, an interface identifier associated with the source node, and/or an interface load associated with the first node. The short timestamp may represent a portion (e.g., the 32 least significant bits corresponding to the nanoseconds) of a second full timestamp indicative of a second time at which the source node handled the probe packet.

The source node may further be configured to generate the first telemetry data. In some examples, the first telemetry data may be formatted as an MCD entry. The source node may append the first telemetry data to an MCD stack included in the first header of the probe packet. The source node may then send the probe packet through the network (e.g., via one or more midpoint nodes) to the sink node. For example, the source node may send the probe packet to the sink node via a first network flow. In some examples, the first flow may include a first midpoint node and second midpoint node as intermediate hops prior to reaching the sink node. The probe packet may gather telemetry data from the nodes in a flow as the packet traverses the network. For example, following traversal of the probe packet through the network according to the first flow the MCD stack in the HbH-PT header (e.g., the first header) of the probe packet may comprise a first MCD entry comprising first telemetry data associated with the source node, a second MCD entry comprising second telemetry data associated with the first midpoint node, a third MCD entry comprising third telemetry data associated with second midpoint node, and/or a fourth MCD entry comprising fourth telemetry data associated with the sink node.

The sink node may be configured to process received probe packet(s) in various ways, as described in more detail below. In some examples, the sink node may receive a probe packet, process the probe packet, and/or forward the probe packet to a regional collector component of the network controller, where an analytics component of the network controller may determine various analytics associated with the network based on the path tracing sequence. In some examples, the analytics may comprise ECMP analytics, network function virtualization (NFV) chain proof of transit analytics, latency analytics, jitter analytics, and/or the like.

The network controller may be configured to determine source node path tracing information associated with the source node. The network controller may store a lookup table indicating nodes in the network having a specific capability (e.g., the optimized behavior). The network controller may receive probe packets from the sink node following execution of the path tracing sequence. The network controller may determine the source address (e.g., the source node) of the probe packet and query the lookup table to see if the source node exists. That is, the network controller may check the lookup table to see if the source node is an optimized source node. The network controller may identify the source node in the lookup table, and begin to determine the path tracing information for the optimized behavior. For example, the network controller may process the data from the MCD stack (or the MCD entry corresponding to the source node) to leverage the telemetry data generated by the source node and appended to the first header. Additionally, or alternatively, the network controller may identify the first full timestamp included in the SRH PT-TLV header and/or the DOH (e.g., the second header) of the probe packet. The network controller may then determine a final full timestamp for the source node based on the first full timestamp and the short timestamp included in the telemetry data. For example, the network controller may leverage a portion (e.g., the first 32-bits) of the first full timestamp representing seconds and append the short timestamp representing nanoseconds to portion of the first full timestamp to generate the final full timestamp for the source node.

Another aspect of this disclosure includes techniques for processing the path tracing probe packets using hardware (e.g., hardware of a node) and without the involvement of a path tracing collector component of a network controller. A path tracing collector component of a network controller, such as, for example, a regional collector, may be configured to receive path tracing probe packets, parse the probe packets, and store the probe packets in a timeseries database. The techniques described herein may provide a sink node the ability to perform the detection of ECMP paths between a source node and a sink node and/or to perform latency analysis of the ECMP paths between the source node and the sink node. The sink node may comprise one or more latency bins stored in the hardware memory thereof. In some examples, a sink node may be configured to store any number of latency bins from 1-X, where X may be any integer greater than 1. That is, such an aspect of the various techniques disclosed herein may allow the performance of path tracing analytics at scale and at a lower cost as the probe packets are first processed in hardware, utilizing less compute resources and at a lesser compute cost. While such techniques do not remove the need for the path tracing collector and/or analytics component of a network controller, these techniques do allow for building automated assurance at scale and at a lower cost as the hardware of the sink nodes are leveraged and the path tracing solutions may not have the dependency on the computationally expensive path tracing collector component of a network controller. In addition, the path tracing analytics data generated as a result of the sink nodes processing the probe packets may be fed into an analytics component of the controller for further analysis, as described in more detail below.

As previously described, a sink node may be configured to perform detection of ECMP paths between a source node and the sink node according to the techniques described herein. In some examples, detection of ECMP paths by the sink node may be a mechanism that is executed by both the source node and the sink node in synchronization. Additionally, or alternatively, such a mechanism may be triggered by the source node.

The source node may be configured to maintain a timecounter that every X minute(s) triggers an ECMP discovery procedure, where X may be any integer greater than 0. When the ECMP discovery procedure begins, the source node may begin to generate IPV6 probe packets. The source node may be configured to generate any number of probe packets from 1-X, where X may be any integer greater than 1. In some examples, the source node may configure the source address of the probe packet(s) to be the source node, the destination address of the probe packet(s) to be the IPV6 loopback address of the sink node, and/or the flow label to be a random number, such as, for example, a current time at the time of generation of the probe packet, a random number generated by an algorithm, and/or any other form of random number to ensure entropy in the flow labels. That is, a large number (e.g., 10,000) of probe packets may be generated by the source node and sent toward the sink node through a number (e.g., 100) of ECMP paths at random. By sending a greater number of probe packets than there are ECMP paths in the network, the random flow labels can be assumed to cover the lesser number of ECMP paths. Additionally, or alternatively, the flow labels of the probe packets may be set to specific ECMP paths through the network rather than utilizing the random flow labels. In some examples, the probe packet(s) may comprise any of the headers and/or information described herein with reference to probe packets. Additionally, or alternatively, source nodes configured with the optimized behavior described herein may be utilized in tandem with the hardware-based processing of the probe packets.

The sink node may be configured to maintain a flow table that is used to monitor the flows in the network. In some examples, the sink node may utilize this table to recognize a new flow in the network by creating a vector with the 5-tuple associated with a given flow, performing a hash of the vector, and then querying the table to determine whether the hash exists. For example, the sink node may generate a vector representation of the flow based on the sequence of interface IDs within the HbH-PT header of the probe packet. The sink node may then perform a hash on the vector representation of the flow to determine a hash of the flow. In some examples, the short timestamp and/or the load fields of the HbH-PT header may be masked. In examples where the sink node determines that the hash of the flow does not exist (e.g., there is a miss) in the flow table, the sink node may send the packet to the network controller. Additionally, or alternatively, the sink node may enter the hash into the flow table such that additional probe packets having the same flow are not determined to be new in the network. That is, for example, if there are X (e.g., 100) different flow label values that report the same path, only the first one may be reported to the network controller. Once the burst of packets from the source node has finished, the sink node may inform the source node of the set of unique IPV6 flow labels to ensure that all of the paths have been traversed. In some examples, the source node may send a confirmation and/or a denial back to the sink node in response.

Additionally, or alternatively, a sink node may be configured to perform latency analysis on the ECMP paths between a source node and the sink node according to the techniques described herein. In some examples, the sink node may be configured to bin the probe packets based on the latency associated with the probe packet. That is, the sink node may calculate the latency of the probe packet (e.g., the flow through the network) based on determining the source node full timestamp according to the techniques described herein and/or a sink node timestamp representing the time at which the probe packet was received. The sink node may then store probe packets in any number of latency bins from 1-X, where X may be any integer greater than 1. The latency bins may be stored in hardware memory of a given sink node. A network administrator and/or an operator of the network may configure the number of bins according to the type of latency analysis they wish to perform on the network (e.g., more or less bins to get a better understanding of the latency distribution). The bins may be associated with various measures (e.g., seconds, nanoseconds, etc.) of latency values 1-X, where X may be any integer greater than 1. By storing the probe packets in the bins of the latency database, a latency distribution of the network may be generated. For example, the sink node(s) may be configured to report the probe packets stored in the latency bins to a regional collector component of a network controller based on a fixed interval and/or threshold. In some examples, a fixed interval may be configured, such as, for example, X minutes, where X may be any integer greater than 0. That is, the sink node may be configured to send telemetry data representing the probe packets stored in the respective latency bin(s) to the regional collector every X minutes (e.g., 1, 5, 10, 15, etc.). Additionally, or alternatively, a threshold may be configured, such as, for example, X probe packets, where X may be any integer greater than 0. That is, the sink node may be configured to send telemetry data representing the probe packets stored in the respective latency bin(s) to the regional collector once the total number of probe packets stored in the latency bin(s) meets and/or exceeds the threshold number X probe packets (e.g., 10, 100, 200, 300, etc.). In some examples, the latency distribution may be leveraged to generate a latency histogram representing the latency distribution of the network. Additionally, or alternatively, the latency database and/or latency distribution may be generated on a per ECMP basis. Additionally, or alternatively, the sink node may be configured to determine an ECMP path associated with a probe packet having a random flow label utilizing the interface identifiers stored in MCD entries of the MCD stack in the HbH-PT header.

The network controller may be configured to perform further latency analytics on the network. In some examples, the network controller may be configured to generate a graphical representation of the latency histogram for presentation via a graphical user interface (GUI) on a display of a computing device. Additionally, or alternatively, the network controller may be configured to determine a packet loss associated with the network. For example, the network controller may receive a first counter from the source node representing a first number of probe packets that were sent from the source node. Additionally, or alternatively, the network controller may receive a second counter from the sink node representing a second number of the probe packets that were received at the sink node. The network controller may utilize the first counter and the second counter to determine a packet loss associated with the network based on execution of the path tracing sequence.

As described herein, a computing-based and/or cloud-based solution, service, node, and/or resource can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to path tracing sequences. For example, by configuring the source nodes with the optimized behavior described herein, path tracing may performed utilizing a source node on ASICs with edit-depth limitations and on ASICs that do not have access to the full 64-bit timestamp. Additionally, since the optimized behavior is akin to behavior at the midpoint, the same micro-code may be utilized, thus saving NPU resources on the source node. Further, by processing probe packets utilizing hardware at the sink node, compute resource costs are reduced as the cost to process the probe packets using hardware is much less than the costs of utilizing the software on the network controller. By configuring the sink nodes to store the probe packets in bins corresponding to latency values, a latency distribution and/or a latency histogram associated with the network may be generated and analyzed for further network improvements and assurance. The discussion above is just some examples of the multiple improvements that may be realized according to the techniques described in this disclosure. These and other improvements will be easily understood and appreciated by those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic view of an example system-architecture 100 of a network 102 for implementing various path tracing technologies described herein. Generally, the network 102 may include devices that are housed or located in one or more data centers 104 that may be located at different physical locations. For instance, the network 102 may be supported by networks of devices in a public cloud computing platform, a private/enterprise computing platform, and/or any combination thereof. The one or more data centers 104 may be physical facilities or buildings located across geographic areas that are designated to store networked devices that are part of the network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network 102 may not be located in explicitly defined data centers 104 and, rather, may be located in other locations or buildings.

The network 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs)—both centralized and/or distributed—and/or any combination, permutation, and/or aggregation thereof. The network 102 may include devices, virtual resources, or other nodes that relay packets from one network segment to another.

The network 102 may include or otherwise be distributed (physically or logically) into a control plane 106 and a data plane 108 (e.g., a network fabric). The control plane 106 may include a network controller 110 including a regional collector component 112, a timeseries database 114 comprising one or more probe stores 116(1)-(N), an analytics component 118 comprising one or more analytics 120(1)-(N) associated with the network 102, an application programming interface 122, one or more visualizations 124 associated with the network 102, and/or one or more external customers 126. The data plane 108 may include one or more nodes, such as, for example, a source node 128, one or more midpoint node(s) 130, and/or a sink node 132. In some examples, the sink node 132 may comprise one or more latency bins 134 for storing probe packets based on associated latency values, as described in more detail below. A sink node 132 may be configured to store any number of latency bins from 1-X in the hardware memory thereof, where X may be any integer greater than 1.

In FIG. 1, the source node 128 may be configured as an ingress provider edge router, a top of rack switch, a Smart-NIC, and/or the like. The source node 128 may be configured with the optimized behavior described herein allowing for implementation of path tracing behavior on an ASIC of the source node 128 with edit-depth limitations and/or on an ASIC of the source node 128 that does not have access to a full 64-bit timestamp. The source node 128 may receive an instruction to begin a path tracing sequence. In some examples, the source node 128 may receive an instruction that a probe packet 136 is to be to at least a second node of the network (e.g., the sink node 132). The source node 128 may be configured to generate one or more probe packets 136. In some examples, a probe packet 136 generated by the source node 128 may include at least a first header at a first depth in the probe packet 136 and/or a second header at a second depth in the probe packet 136. In some examples, the second depth may be deeper in the packet than the first depth. Additionally, or alternatively, the first header may be configured as a HbH-PT header comprising an MCD stack for carrying telemetry data associated with the node(s) 128, 130, 132 in the network 102. Additionally, or alternatively, the second header may be configured as a SRH PT-TLV header and/or the DOH. The format of the probe packet 136, the headers, and the information included therein are described in more detail below with respect to FIGS. 2A-2C.

The source node 128 may also be configured to generate first timestamp data including a first full timestamp (e.g., a PTP transmission 64-bit timestamp) indicative of a first time at which the source node 128 handled the probe packet 136. In some examples, a CPU of the source node 128 may be configured to generate the first timestamp data. The source node 128 may append the first full timestamp to the second header of the probe packet 136. Additionally, or alternatively, the source node 128 may be configured to determine first telemetry data associated with the source node 128. In some examples, an NPU of the source node 128 may be configured to generate the telemetry data. In some examples, the first telemetry data may include a short timestamp, an interface identifier associated with the source node 128, and/or an interface load associated with the first node 128. The short timestamp may represent a portion (e.g., the 32 least significant bits corresponding to the nanoseconds) of a second full timestamp indicative of a second time at which the source node handled the probe packet 136.

The source node 128 may further be configured to generate the first telemetry data. In some examples, the telemetry data may be formatted as an MCD entry. The source node 128 may append the telemetry data to an MCD stack included in the first header of the probe packet 136. The source node may then send the probe packet 136 through the network 102 (e.g., via one or more midpoint nodes 130) to the sink node 132. For example, the source node 128 may send the probe packet 136 to the sink node 132 via a first network flow. In some examples, the first flow may include midpoint node B 130 and midpoint node E 130 as intermediate hops prior to reaching the sink node. The probe packet 136 may gather telemetry data from the nodes 128, 130, 132 in a flow as the packet traverses the network 102. For example, following traversal of the probe packet 136 through the network 102 according to the first flow (e.g., nodes A, B, E, H) the MCD stack in the HbH-PT header (e.g., the first header) of the probe packet 136 may comprise a first MCD entry comprising first telemetry data associated with the source node, a second MCD entry comprising second telemetry data associated with midpoint node B 130, a third MCD entry comprising third telemetry data associated with midpoint node E 130, and/or a fourth MCD entry comprising fourth telemetry data associated with the sink node 132.

The sink node 132 may be configured to process received probe packet(s) 136 in various ways, as described in more detail below. In some examples, the sink node 132 may receive a probe packet 136, process the probe packet 136, and/or forward the probe packet 136 to the regional collector component 112 of the network controller 110, where the analytics component 118 may determine various analytics 120 associated with the network 102 based on the path tracing sequence. In some examples, the analytics 120 may comprise ECMP analytics, network function virtualization (NFV) chain proof of transit analytics, latency analytics, jitter analytics, and/or the like.

The network controller 110 may be configured to determine source node path tracing information associated with the source node 128. The network controller 110 may store a lookup table indicating nodes in the network 102 having a specific capability (e.g., the optimized behavior). The network controller 110 may receive probe packets 136 from the sink node 132 following execution of the path tracing sequence. The network controller 110 may determine the source address (e.g., the source node 128) of the probe packet 136 and query the lookup table to see if the source node 128 exists. That is, the network controller 110 may check the lookup table to see if the source node 128 is an optimized source node. The network controller 110 may identify the source node 128 in the lookup table, and begin to determine the path tracing information for the optimized behavior. For example, the network controller 110 may decompress the compressed data from the MCD stack (or the MCD entry corresponding to the source node) to leverage the telemetry data generated by the source node 128 and appended to the first header. Additionally, or alternatively, the network controller 110 may identify the first full timestamp included in the SRH PT-TLV header and/or the DOH (e.g., the second header) of the probe packet 136. The network controller 110 may then determine a final full timestamp for the source node 128 based on the first full timestamp and the short timestamp included in the telemetry data. For example, the network controller 110 may leverage a portion (e.g., the first 32-bits) of the first full timestamp representing seconds and append the short timestamp representing nanoseconds to portion of the first full timestamp to generate the final full timestamp for the source node 128.

As previously mentioned, the sink node 132 may be configured to process probe packets 136 in various ways. In some examples, the sink node 132 may be configured to process the path tracing probe packets 136 using hardware (e.g., hardware of the sink node 132) and without the involvement of the regional collector 112 of the network controller 110. As previously described, the regional collector 112 of the network controller 110 may be configured to receive path tracing probe packets 136, parse the probe packets 136, and store the probe packets 136 in one or more latency bin(s) 134 locally on the hardware memory of the corresponding sink node 132. The techniques described herein may provide the sink node 132 with the ability to perform the detection of ECMP paths between a source node 128 and a sink node 132 and/or to perform latency analysis of the ECMP paths between the source node 128 and the sink node 132. That is, such an aspect of the various techniques disclosed herein may allow the performance of path tracing analytics at scale and at a lower cost as the probe packets are first processed in hardware, utilizing less compute resources and at a lesser compute cost. While such techniques do not remove the need for the regional collector 112 and/or analytics component 118 of the network controller 110, these techniques do allow for building automated assurance at scale and at a lower cost as the hardware of the sink nodes 132 are leveraged and the path tracing solutions may not have the dependency on the computationally expensive regional collector 112 of the network controller 110. In addition, the path tracing analytics data generated as a result of the sink nodes 132 processing the probe packets 136 may be fed into the analytics component 118 of the controller 110 for further analysis, as described in more detail below.

For example, the sink node(s) 132 may be configured to report the probe packets 136 stored in the latency bins 134 to the regional collector component 112 of the network controller 110 based on a fixed interval and/or threshold. In some examples, a fixed interval may be configured, such as, for example, X minutes, where X may be any integer greater than 0. That is, the sink node 132 may be configured to send telemetry data representing the probe packets 136 stored in the respective latency bin(s) 134 to the regional collector 112 every X minutes. Additionally, or alternatively, a threshold may be configured, such as, for example, X probe packets, where X may be any integer greater than 0. That is, the sink node 132 may be configured to send telemetry data representing the probe packets 136 stored in the respective latency bin(s) 134 to the regional collector 112 once the total number of probe packets 136 stored in the latency bin(s) 134 meets and/or exceeds the threshold number X probe packets.

As previously described, a sink node 132 may be configured to perform detection of ECMP paths (or flows) between a source node 128 and the sink node 132 according to the techniques described herein. In some examples, detection of ECMP paths by the sink node 128 may be a mechanism that is executed by both the source node 128 and the sink node 132 in synchronization. Additionally, or alternatively, such a mechanism may be triggered by the source node 128.

The source node 128 may be configured to maintain a time-counter that every X minute(s) triggers an ECMP discovery procedure, where X may be any integer greater than 0. When the ECMP discovery procedure begins, the source node 128 may begin to generate IPV6 probe packets 136. The source node 128 may be configured to generate any number of probe packets 136 from 1-X, where X may be any integer greater than 1. In some examples, the source node 128 may configure the source address of the probe packet(s) 136 to be the source node 128, the destination address of the probe packet(s) 136 to be the IPV6 loopback address of the sink node 132, and/or the flow label to be a random number, such as, for example, a current time at the time of generation of the probe packet, a random number generated by an algorithm, and/or any other form of random number to ensure entropy in the flow labels. That is, a large number (e.g., 10,000) of probe packets 136 may be generated by the source node 128 and sent toward the sink node 132 through a number (e.g., 100) of ECMP paths at random. By sending a greater number of probe packets 136 than there are ECMP paths in the network 102, the random flow labels can be assumed to cover the lesser number of ECMP paths. Additionally, or alternatively, the flow labels of the probe packets 136 may be set to specific ECMP paths through the network 102 rather than utilizing the random flow labels. In some examples, the probe packet(s) 136 may comprise any of the headers and/or information described herein with reference to probe packets 136, as described in more detail with respect to FIGS. 2A-2C. Additionally, or alternatively, source nodes 128 configured with the optimized behavior described herein may be utilized in tandem with the hardware-based processing of the probe packets 136.

The sink node 132 may be configured to maintain a flow table that is used to monitor the flows in the network 102. In some examples, the sink node 132 may utilize this table to recognize a new flow in the network 102 by creating a vector with the 5-tuple associated with a given flow, performing a hash of the vector, and then querying the table to determine whether the hash exists. For example, the sink node 132 may generate a vector representation of the flow based on the sequence of interface IDs within the HbH-PT header of the probe packet 136. The sink node 132 may then perform a hash on the vector representation of the flow to determine a hash of the flow. In some examples, the short timestamp and/or the load fields of the HbH-PT header may be masked. In examples where the sink node 132 determines that the hash of the flow does not exist (e.g., there is a miss) in the flow table, the sink node 132 may send the packet to the network controller 110. Additionally, or alternatively, the sink node 132 may enter the hash into the flow table such that additional probe packets 136 having the same flow are not determined to be new in the network 102. That is, for example, if there are X (e.g., 100) different flow label values that report the same path, only the first one may be reported to the network controller 110. Once the burst of packets 136 from the source node 128 has finished, the sink node 132 may inform the source node 128 of the set of unique IPV6 flow labels to ensure that all of the paths have been traversed. In some examples, the source node 128 may send a confirmation and/or a denial back to the sink node 132 in response.

Additionally, or alternatively, a sink node 132 may be configured to perform latency analysis on the ECMP paths between a source node 128 and the sink node 132 according to the techniques described herein. In some examples, the sink node 132 may be configured to bin the probe packets 136 based on the latency associated with the probe packet 136. That is, the sink node 132 may calculate the latency of the probe packet 136 (e.g., the flow through the network 102) based on determining the source node 128 full timestamp according to the techniques described herein (e.g., the final full timestamp described above) and/or a sink node 132 timestamp representing the time at which the probe packet 136 was received by the sink node 132). The sink node 132 may then store probe packets 136 in the latency bins 134 (e.g., a latency database) comprising any number of latency bins 134. As previously described, the timeseries database 114 may be provisioned in association with the network controller 110 and the sink node(s) 132 may be configured to send telemetry data representing the probe packets 136 stored in the respective latency bins 134. A network administrator and/or an operator of the network 102 may configure the number of bins 134 according to the type of latency analysis they wish to perform on the network 102 (e.g., more or less bins 134 to get a better understanding of the latency distribution). The bins 134 may be associated with various measures (e.g., seconds, nanoseconds, etc.) of latency values 1-X, where X may be any integer greater than 1. By storing the probe packets 136 in the bins 134 and reporting telemetry representing the data stored therein to the probe stores 116 of the timeseries database 114, a latency distribution of the network 102 may be generated. In some examples, the latency distribution may be leveraged to generate one or more visualizations 124 (e.g., a latency histogram) representing the latency distribution of the network 102. Additionally, or alternatively, the latency distribution may be generated on a per ECMP basis. Additionally, or alternatively, the sink node 132 may be configured to determine an ECMP path associated with a probe packet 136 having a random flow label utilizing the interface identifiers stored in MCD entries of the MCD stack in the HbH-PT header.

Figure 2A:
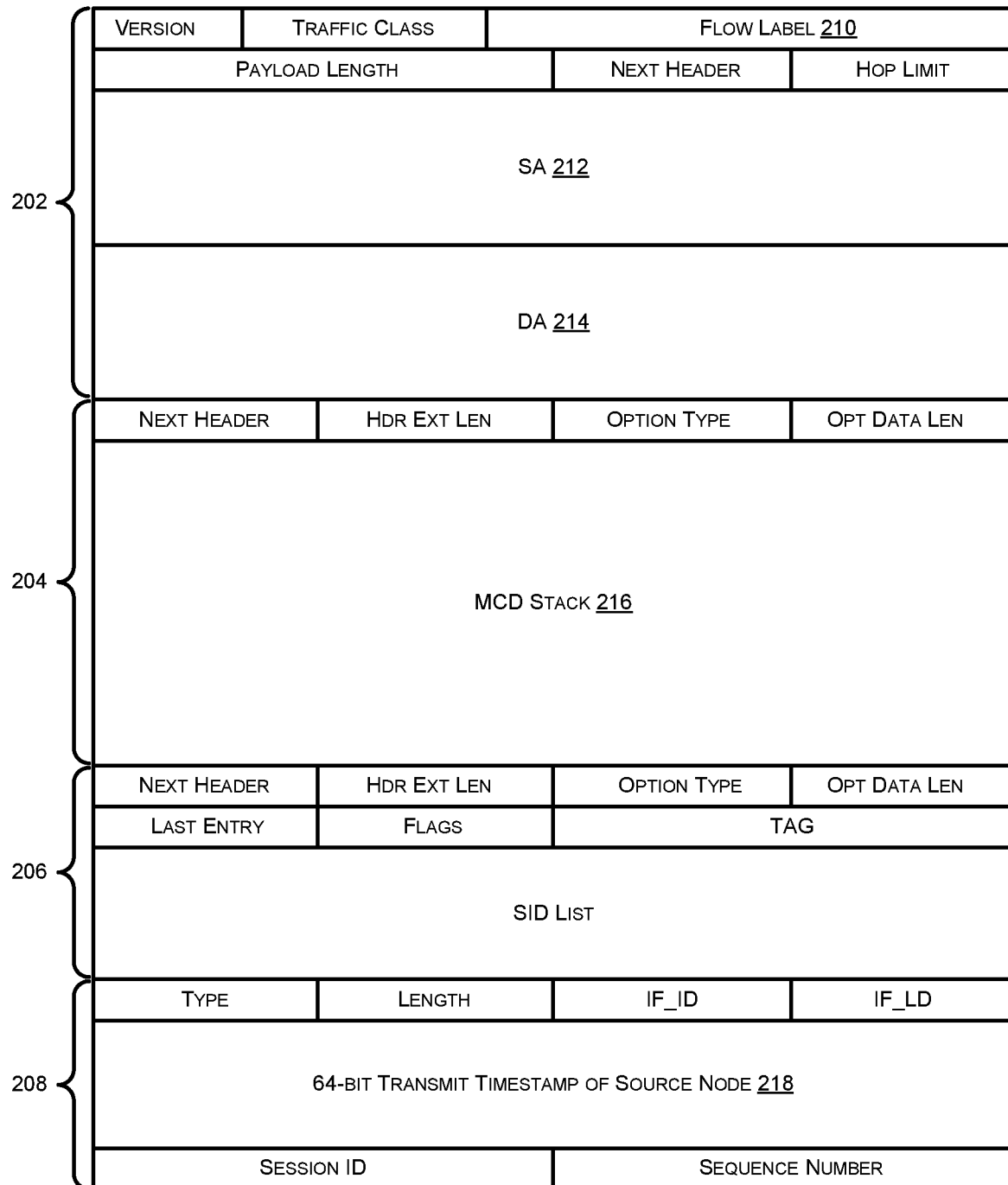
FIG. 2A illustrates an example path tracing probe packet utilized for implementing the technologies described herein.
Figure 2B:
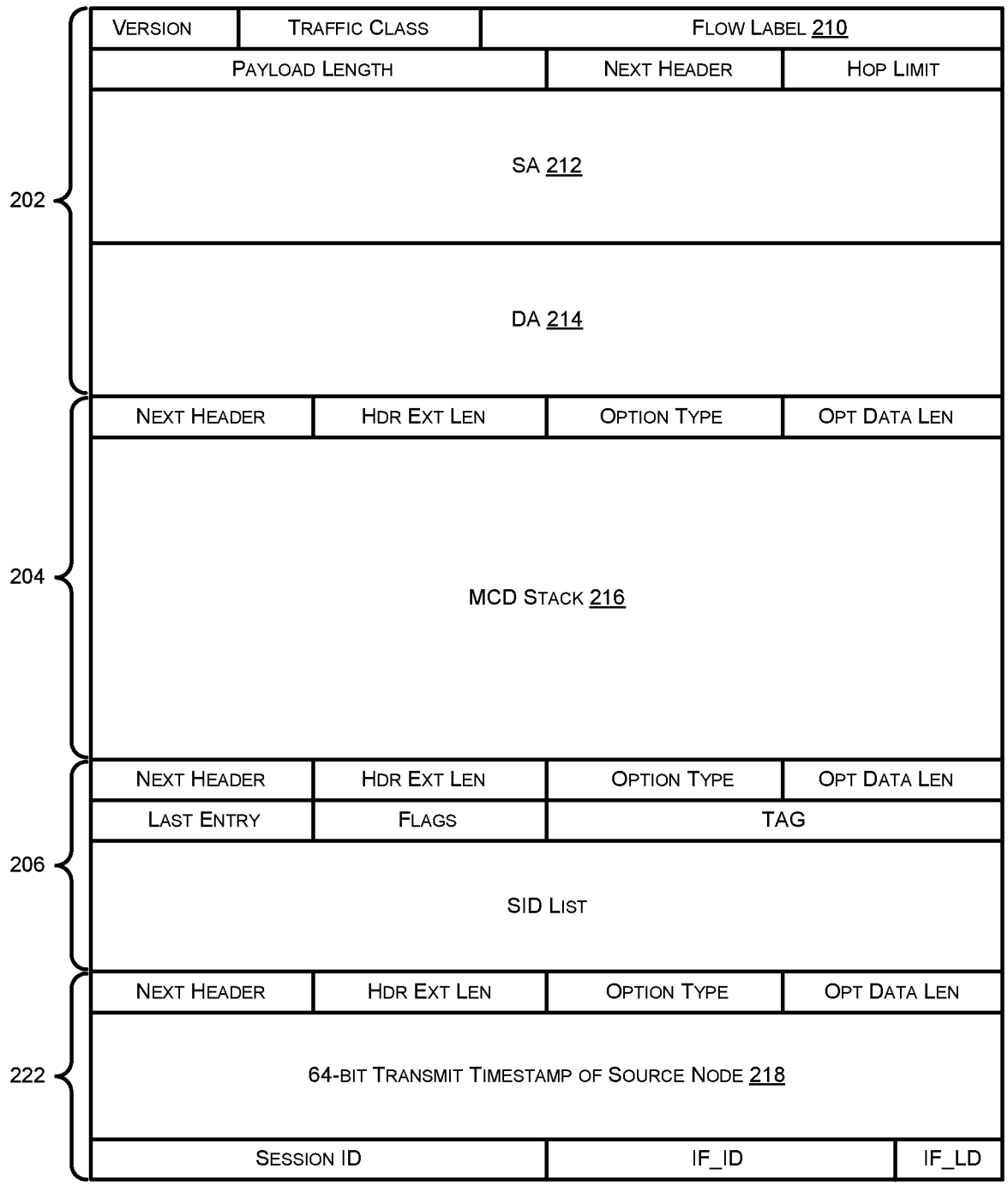
FIG. 2B illustrates another example path tracing probe packet utilized for implementing the technologies described herein.
Figure 2C:
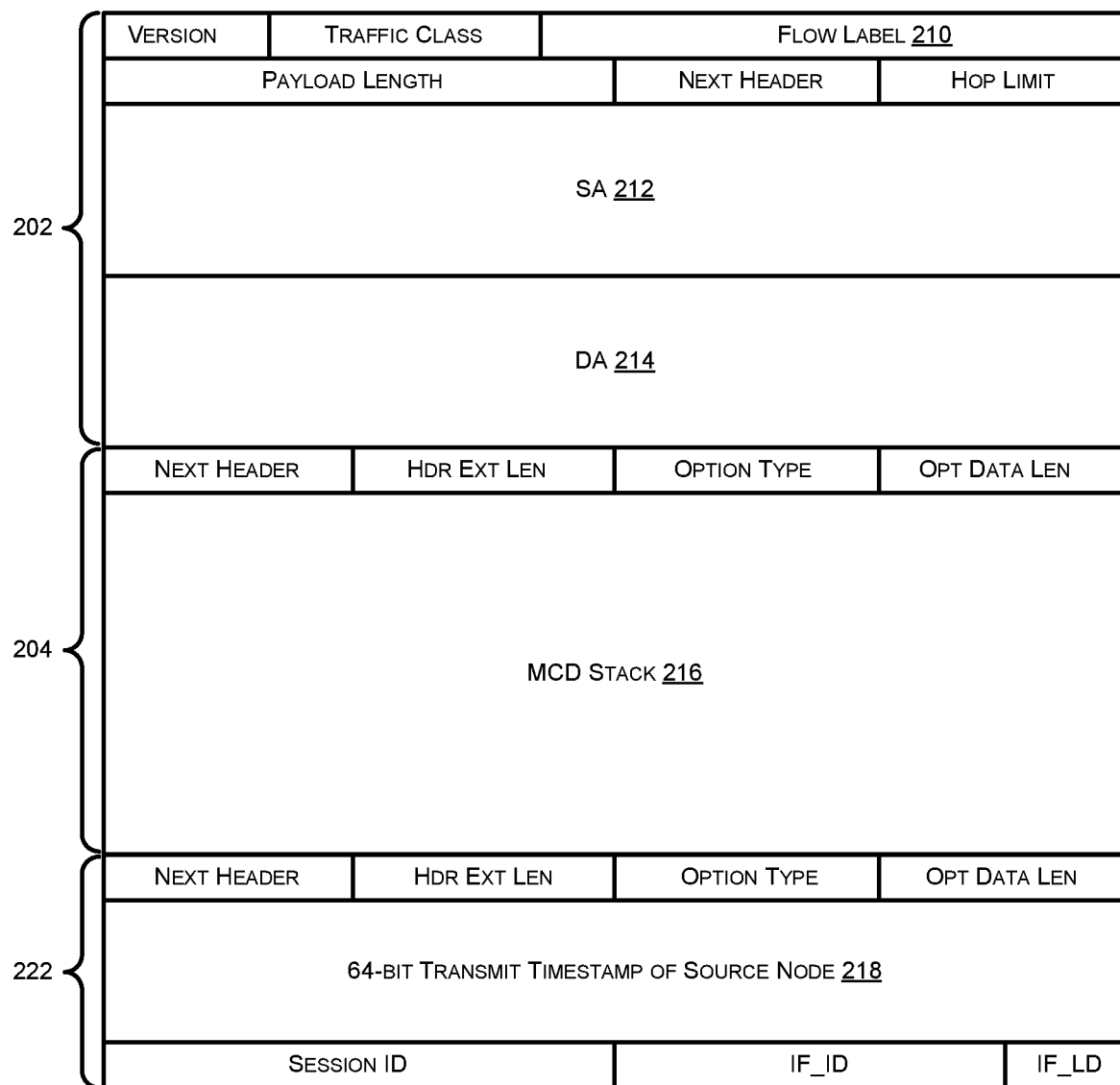
FIG. 2C illustrates another example path tracing probe packet utilized for implementing the technologies described herein.

FIGS. 2A-2C illustrate example path tracing probe packets 200, 220, 230 utilized for implementing the technologies described herein.

FIG. 2A illustrates an example path tracing probe packet 200 utilized for implementing the technologies described herein. In some examples, the probe packet 200 may correspond to the probe packet 136 as previously described with respect to FIG. 1. The probe packet 200 may include one or more headers, such as, for example, a first header 202 (e.g., an IPV6 header), a second header 204 (e.g., a HbH-PT header), a third header 206 (e.g., a segment routing header), and/or a fourth header 208 (e.g., a SRH PT-TLV header). The headers 202, 204, 206, 208 may include various fields for storing information associated with the network, such as, for example, the network 102 and/or nodes in the network, such as, for example, the source node 128, the midpoint node(s) 130, and/or the sink node 132 as described with respect to FIG. 1. In some examples, the second header 204 as illustrated in FIG. 2A may correspond to the first header as described with respect to FIG. 1. Additionally, or alternatively, the fourth header 208 as illustrated in FIG. 2A may correspond to the second header as described with respect to FIG. 1. As illustrated in FIG. 2A, the second header 204 is shallower in the packet 200 than the fourth header 208.

The first header 202 may be configured as a standard IPV6 header, including a version field indicating IPV6, a traffic class field, a flow label field 210, a payload length field, a next header field specifying the type of the second header 204, a hop limit field, a source address field 212, and/or a destination address field 214. As described with respect to FIG. 1, a source node may utilize the flow label field 210, the source address field 212, and/or the destination address field 214 to perform the various operations described herein.

The second header 204 may be configured as a hop-by-hop extension header of the first header 202. The second header may comprise a next header field specifying the type of the third header 206, a header extension length field, an option type field, an option data length field, and/or an MCD stack 216. The MCD stack 216 may be configured to store any number of MCD entries 1-X, where X may be any integer greater that 1. As described with respect to FIG. 1, a source node, a midpoint node, a sink node, and/or the network controller may append and/or gather data from the MCD stack 216.

The third header 206 may be configured as a standard segment routing extension header of the first header 202 and/or the second header 204. The third header 206 may include a next header field specifying the type of the fourth header 208, a header extension length field, an option type field, an option data length field, a last entry field, a flags field, a TAG field, and/or a segment routing ID (SID) list field.

The fourth header 208 may be configured as a segment routing path tracing extension header (e.g., SRH PT-TLV) including a type field, a length field, an interface ID field, and interface load field, a 64-bit transmit timestamp of source node field 218, a session ID field, and/or a sequence number field. As described with respect to FIG. 1, a source node, a midpoint node, a sink node, and/or the network controller may append and/or gather data from the SRH PT-TLV, such as, for example, the type field, the length field, the interface ID field, the interface load field, and/or the 64-bit transmit timestamp of source node field 218.

FIG. 2B illustrates an example path tracing probe packet 220 utilized for implementing the technologies described herein. In some examples, the probe packet 220 may correspond to the probe packet 136 as previously described with respect to FIG. 1. The probe packet 220 may include one or more headers, such as, for example, a first header 202 (e.g., an IPv6 header), a second header 204 (e.g., a HbH-PT header), a third header 206 (e.g., a segment routing header), and/or a fifth header 222 (e.g., a Destination Options Header (DOH)). The headers 202, 204, 206, 222 may include various fields for storing information associated with the network, such as, for example, the network 102 and/or nodes in the network, such as, for example, the source node 128, the midpoint node(s) 130, and/or the sink node 132 as described with respect to FIG. 1. In some examples, the second header 204 as illustrated in FIG. 2B may correspond to the first header as described with respect to FIG. 1. Additionally, or alternatively, the fifth header 222 as illustrated in FIG. 2B may correspond to the second header as described with respect to FIG. 1. As illustrated in FIG. 2B, the second header 204 is shallower in the packet 200 than the fifth header 222.

The first header 202 may be configured as a standard IPV6 header, including a version field indicating IPV6, a traffic class field, a flow label field 210, a payload length field, a next header field specifying the type of the second header 204, a hop limit field, a source address field 212, and/or a destination address field 214. As described with respect to FIG. 1, a source node may utilize the flow label field 210, the source address field 212, and/or the destination address field 214 to perform the various operations described herein.

The second header 204 may be configured as a hop-by-hop extension header of the first header 202. The second header may comprise a next header field specifying the type of the third header 206, a header extension length field, an option type field, an option data length field, and/or an MCD stack 216. The MCD stack 216 may be configured to store any number of MCD entries 1-X, where X may be any integer greater that 1. As described with respect to FIG. 1, a source node, a midpoint node, a sink node, and/or the network controller may append and/or gather data from the MCD stack 216.

The third header 206 may be configured as a standard segment routing extension header of the first header 202 and/or the second header 204. The third header 206 may include a next header field specifying the type of the fifth header 222, a header extension length field, an option type field, an option data length field, a last entry field, a flags field, a TAG field, and/or a segment routing ID (SID) list field.

The fifth header 222 may be configured as a Destination Options Header (DOH) including a next header field specifying the type of any additional headers, a header extension length field, an option type field, an option data length field, a 64-bit transmit timestamp of source node field 218, a session ID field, an interface ID field (storing e.g., an outgoing interface identifier), and/or an interface load field. As described with respect to FIG. 1, a source node, a midpoint node, a sink node, and/or the network controller may append and/or gather data from the DOH, such as, for example, the session ID field, the interface ID field, the interface load field, and/or the 64-bit transmit timestamp of source node field 218.

In some examples, the third header 206 may be required in the probe packet 220 to carry an SID list. That is, if the SID list field in the third header 206 comprises more than 1 SID, then the third header 206 may be required for the probe packet 220 to carry the list of SIDs. Additionally, or alternatively, if the SID list only has a single SID, the single SID may be carried in the DA field 214 of the first header 202 and the third header 206 may not be included in the probe packet 230, as illustrated in FIG. 2C. That is, FIG. 2C illustrates a probe packet 230 in examples where the SID list only has a single SID, and carries the single SID in the DA field 214 of the first header 202, and FIG. 2B illustrates a probe packet 220 in examples where the SID list comprises more than 1 SID, thus requiring the SID list field of the third header 206 to carry the SID list in the probe packet 220.

Referring back to FIG. 1, the network controller 110 may be configured to perform further latency analytics 120 on the network 102. In some examples, the network controller 110 may be configured to generate a graphical representation of the latency histogram for presentation via a graphical user interface (GUI) on a display of a computing device. The latency histogram is described in more detail below with reference to FIG. 3. Additionally, or alternatively, the network controller 110 may be configured to determine a packet loss associated with the network 102. For example, the network controller 110 may receive a first counter from the source node 128 representing a first number of probe packets 136 that were sent from the source node 128. Additionally, or alternatively, the network controller 110 may receive a second counter from the sink node 132 representing a second number of the probe packets 136 that were received at the sink node 132. The network controller 110 may utilize the first counter and the second counter to determine a packet loss associated with the network 102 based on execution of the path tracing sequence.

Figure 3:
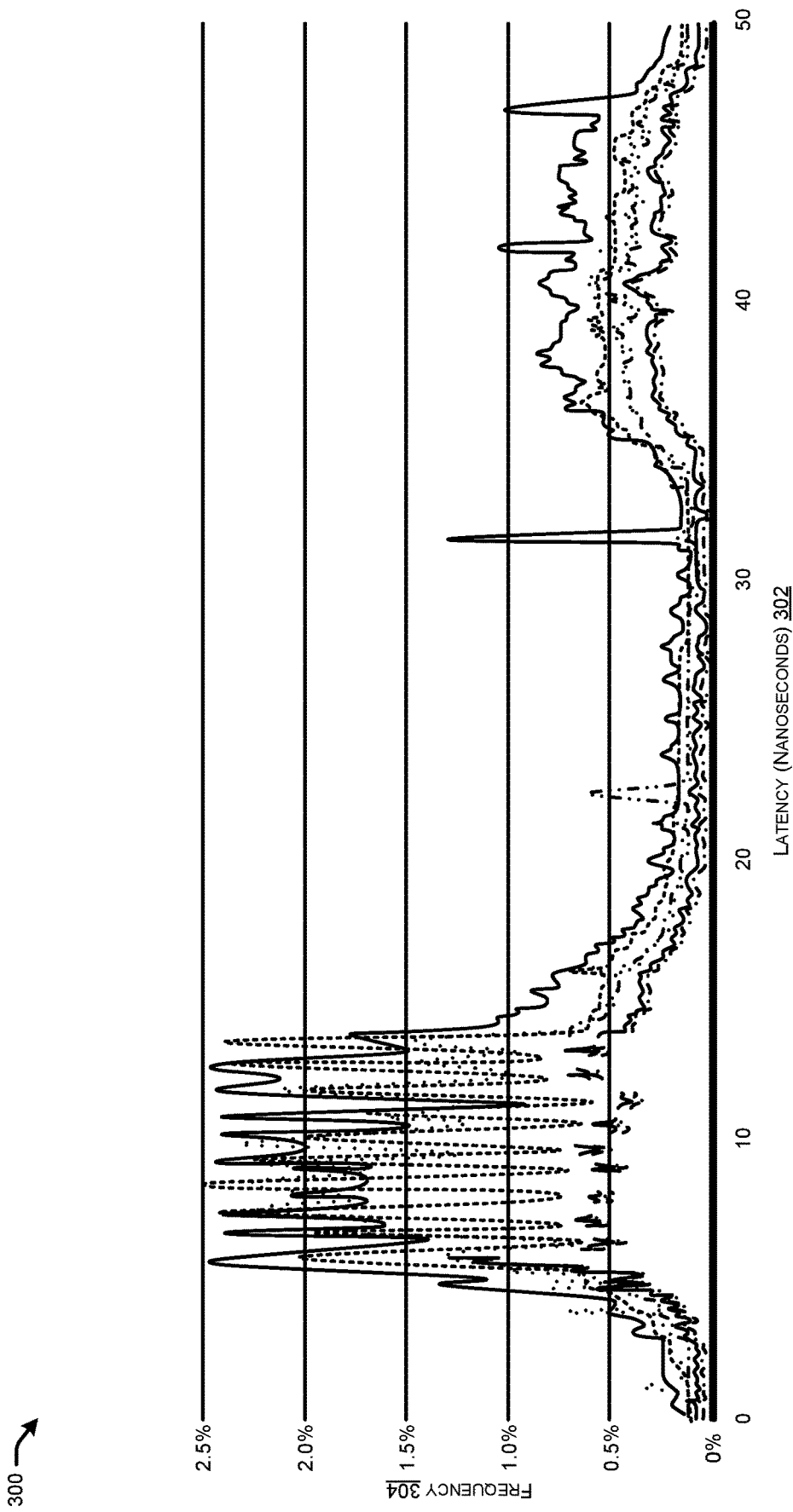
FIG. 3 illustrates an example latency histogram associated with a path tracing sequence.

FIG. 3 illustrates an example latency histogram 300 associated with a path tracing sequence. In some examples, the latency histogram 300 may be generated based on the probe packets 136 that are stored in the respective bins 116 of the timeseries database 114, as described with respect to FIG. 1. As previously described, the bins 116 may be associated with various measures (e.g., seconds, nanoseconds, etc.) of latency values 1-X, where X may be any integer greater than 1. By storing the probe packets 136 in the bins 116 of the timeseries database, a latency distribution of the network 102 may be generated. In some examples, the latency distribution may be leveraged to generate the latency histogram 300 representing the latency distribution of the network 102.

The latency histogram 300 may provide a visual representation of the latency of the network 102. For example, the latency histogram 300 may comprise an x-axis configured as a measure of latency 302. In some examples, the measure of latency 302 may be measured in seconds, nanoseconds, milliseconds, and/or the like. Additionally, or alternatively, the latency histogram 300 may comprise a y-axis configured as a measure of frequency 304. In some examples, the measure of frequency 304 may represent a number and/or a percentage of flows in the network that have the corresponding measure of latency 302. In some examples, the latency histogram 300 may provide latency analysis for various networks 102. As illustrated, the latency histogram 300 may utilize different style lines to represent different ECMP paths through the network 102 (e.g., solid lines, dashed lines, dotted lines, etc.)

FIGS. 4-10 illustrate flow diagrams of example methods 400-1000 and that illustrate aspects of the functions performed at least partly by the cloud network(s), the enterprise network(s), the application network(s), and/or the metadata-aware network(s) and/or by the respective components within as described in FIG. 1. The logical operations described herein with respect to FIGS. 4-10 may be implemented (1) as a sequence of computer-implemented acts or program modules running on a computing system and/or (2) as interconnected machine logic circuits or circuit modules within the computing system. In some examples, the method(s) 400-1000 may be performed by a system comprising one or more processors and one or more non-transitory computer-readable media storing computer-executable instructions that, when executed by the one or more processors, cause the one or more processors to perform the method(s) 400-1000.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
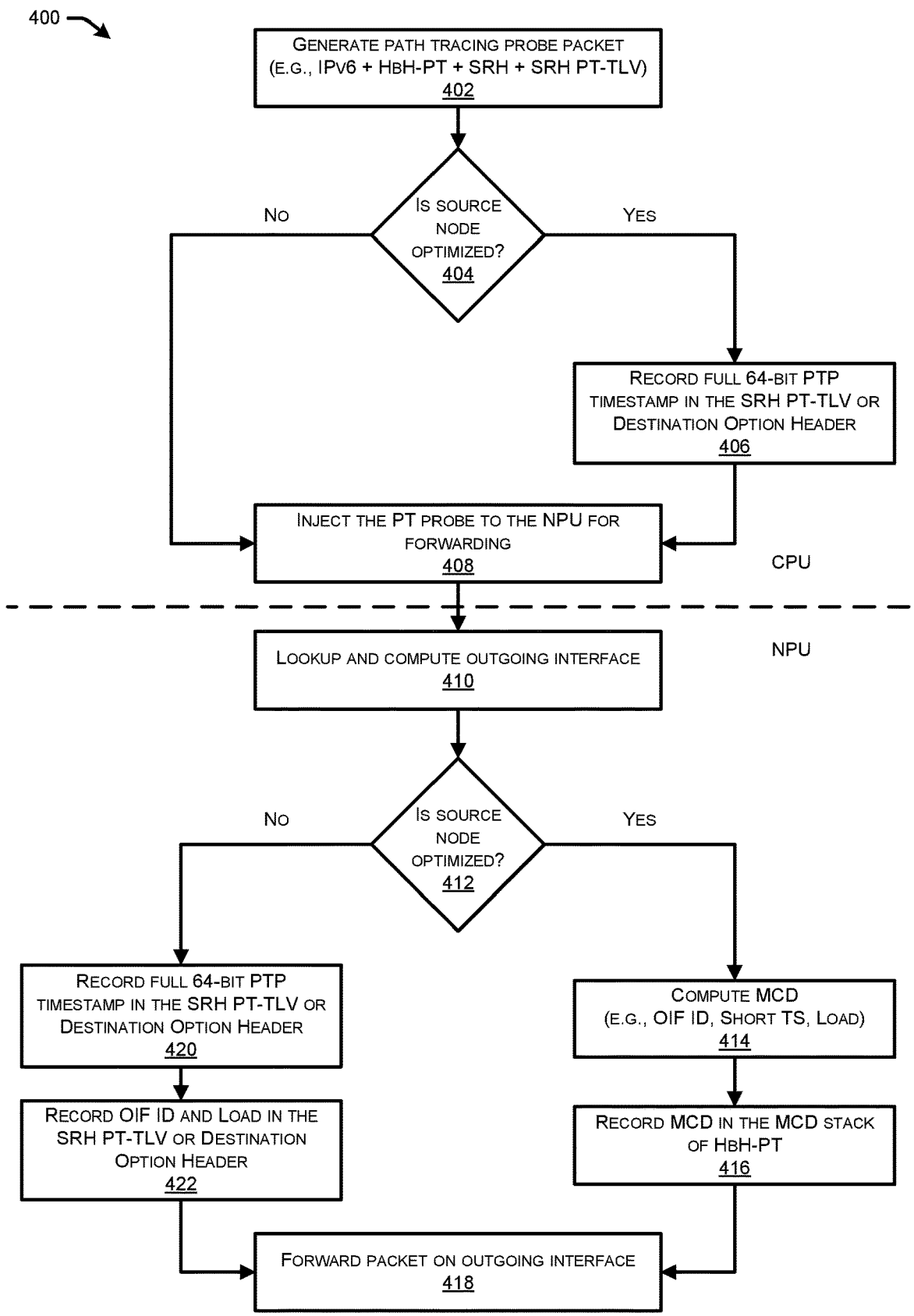
FIG. 4 illustrates flow diagram of an example method for generating a probe packet performed at least partly by a central processing unit (CPU) and/or a network processing unit (NPU) of a source node of a network.

FIG. 4 illustrates flow diagram of an example method 400 for generating a probe packet performed at least partly by a central processing unit (CPU) and/or a network processing unit (NPU) of a source node of a network. In some examples, the source node may correspond to the source node 128 as described with respect to FIG. 1. In some examples, operations 402-408 may be performed by the CPU of a source node and/or operations 410-418 may be performed by the NPU of a source node.

At 402, the method 400 may include generating a path tracing probe packet. The probe packet may be generated by the CPU of the source node. In some examples, a path tracing probe packet may comprise an IPV6 header, a HbH-PT header, an SRH, and/or an SRH PT-TLV, and/or a DOH.

At 404, the method 400 may include determining whether the source node is optimized. In some examples, indications of the optimized behavior may be distributed from the network controller and to each of the source nodes that require the optimized behavior. For example, telemetry data, collected from nodes and associated with prior execution of path tracing sequences may indicate which source nodes comprise the optimized behavior. Additionally, or alternatively, a network administrator may configure the network controller with information about the source nodes including ASICs that require the optimized behavior. Additionally, or alternatively, the network controller may comprise a database including information about the ASICs in each source node and may determine that a given ASIC requires the optimized behavior.

In examples where the source node determines that the optimized behavior is enabled at step 404, the method 400 may proceed to step 406 where the CPU of the source node may record a full 64-bit PTP timestamp representing a first time at which the CPU of the source node handled the probe packet (e.g., the time at which the probe packet is generated) in the SRH PT-TLV and/or the DOH of the second header, and the CPU of the source node may inject the probe packet to the NPU of the source node for forwarding.

At 408, the method 400 may include injecting, by the CPU of the source node, the probe packet to the NPU of the source node for forwarding.

In examples where the source node determines that optimized behavior is not enabled at step 404, the method 400 may skip step 406 and proceed to step 408 where the CPU of the source node may inject the probe packet to the NPU of the source node for forwarding.

At 410, the method 400 may include looking up and computing the outgoing interface of the probe packet. In some examples, the NPU of the source node may perform the lookup and computation of the outgoing interface of the probe packet.

At 412, the method 400 may include determining whether the source node is optimized. In some examples, the NPU may be configured to determine whether the source node is optimized at step 412.

In examples where the source node determines that the optimized behavior is enabled, the method 400 may proceed to step 414, where the NPU of the source node may compute midpoint compressed data (MCD) associated with the source node. That is, a source node having the optimized behavior may perform operations typically performed by a midpoint node and compute the outgoing interface ID, a short timestamp representing a second time at which the NPU of the source node handled the probe packet (e.g., the time at which the source node computes the MCD), and/or the outgoing interface load.

At 416, the method 400 may include recording the MCD in the MCD stack of the HbH-PT included in the first header. Since the first header is at a first depth that is within the edit-depth horizon of the NPU, the NPU may then record the MCD in the MCD stack of the HbH-PT included in the first header.

At 418, the method 400 may include forwarding, by the NPU of the source node, the probe packet on the outgoing interface. In some examples, forwarding the probe packet on the outgoing interface may begin a path tracing sequence.

Additionally, or alternatively, in examples where the source node determines that the optimized behavior is not enabled, the method 400 may proceed to step 420 where the NPU of the source node may record the full 64-bit PTP timestamp in the SRH PT-TLV and/or the DOH included in the second header.

At 422, the method may include recording the outgoing interface and interface load in the SRH-PT-TLV and/or the DOH included in the second header. From 422, the method may then proceed to step 418, where the method 400 may include forwarding, by the NPU of the source node, the probe packet on the outgoing interface. In some examples, forwarding the probe packet on the outgoing interface may begin a path tracing sequence.

Figure 5:
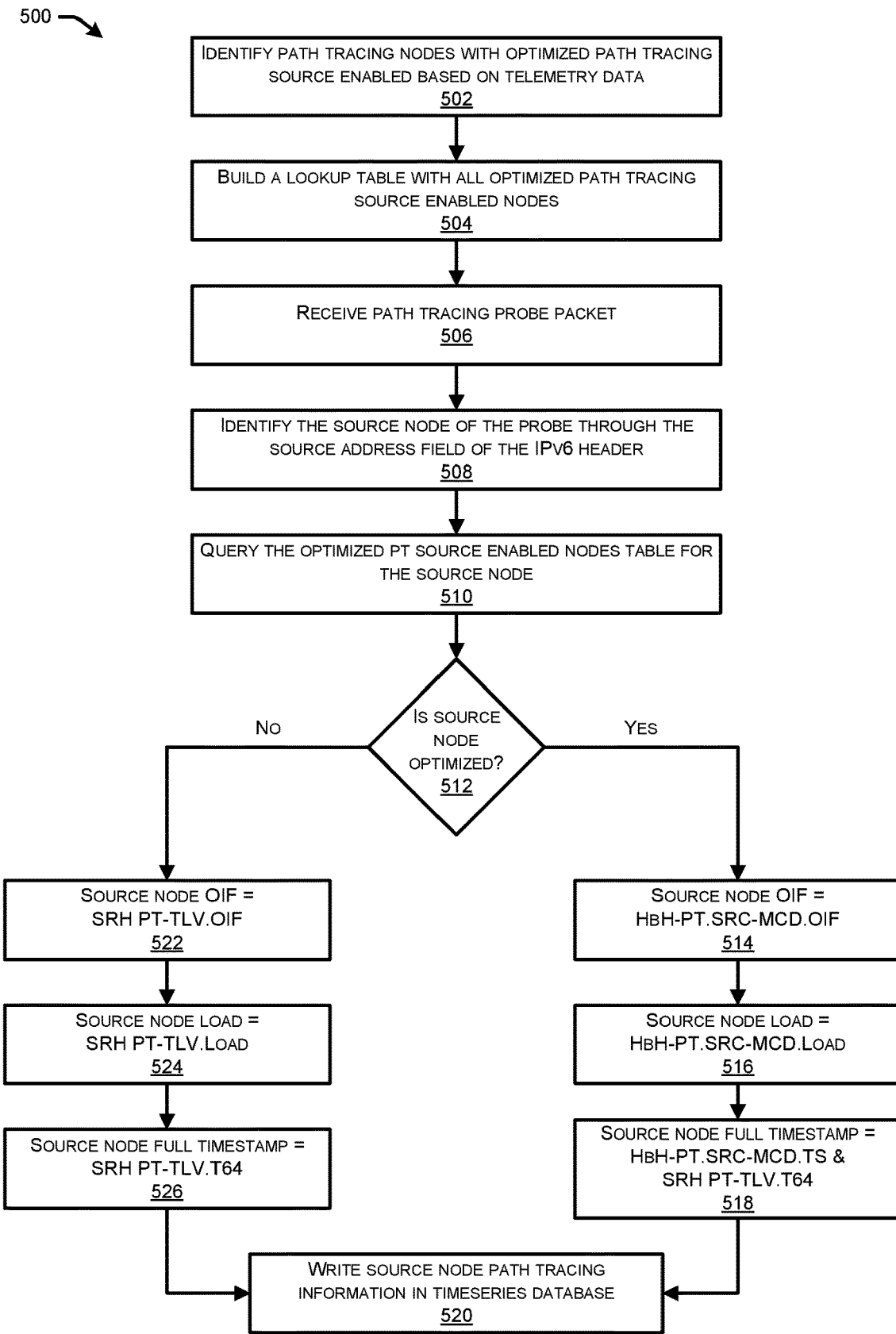
FIG. 5 illustrates a flow diagram of an example method for a network controller of a network to index path tracing information associated with a probe packet originating from a source node in the network comprising a specific capability and/or an optimized behavior described herein.

FIG. 5 illustrates a flow diagram of an example method 500 for a network controller of a network to index path tracing information associated with a probe packet originating from a source node in the network comprising a specific capability and/or an optimized behavior described herein. In some examples, the network controller and/or the source node may correspond to the network controller 110 and/or the source node 128 as described with respect to FIG. 1.

At 502, the method 500 may include identifying path tracing nodes with optimized path tracing source node enabled based on telemetry data received from the nodes. In some examples, telemetry data, collected from nodes and associated with prior execution of path tracing sequences may indicate which source nodes comprise the optimized behavior. Additionally, or alternatively, a network administrator may provide telemetry data to the network controller indicating the source nodes in the network comprising the optimized behavior.

At 504, with the source nodes comprising the optimized behavior identified, the method 500 may include generating a lookup table with all of the path tracing source nodes having the optimized behavior enabled.

At 506, the method 500 may include receiving a path tracing probe packet from a sink node of a network. In some examples, the network controller may be configured to maintain path tracing information for various networks received from various sink nodes provisioned across the various networks.

At 508, the method 500 may include identifying the source node of the probe packet based on a source address field included in an IPV6 header of the probe packet.

With the source node identified, at 510, the method 500 may include querying the lookup table for the source node. That is, the network controller may query the lookup table to see if the source node from which the probe packet originated is included as an optimized source node.

At 512, the method 500 may include determining if the source node is optimized. In examples, where the network controller determines that the source node is optimized, the method 500 may proceed to step 514. Alternatively, in examples where the network controller determines that the source node is not optimized, the method 500 may proceed to step 522.

In examples where the network controller identifies the source node of the probe packet in the lookup table, at 514, the method 500 includes determining the source node path tracing information by leveraging information from the MCD stack (or the portion thereof appended to the MCD stack by the source node) included in HbH-PT in the first header. For example, the network controller may set the source node outgoing interface of the source node path tracing information as the HbH-PT.SRC-MCD.OIF (e.g., the outgoing interface field of the MCD entry associated with the source node from the MCD stack in the HbH-PT header).

At 516, the method 500 may include setting the source node load of the source node path tracing information as the HbH-PT.SRC-MCD.Load (e.g., the load field of the MCD entry associated with the source node from the MCD stack in the HbH-PT header).

At 518, the method 500 may include determine the source node full timestamp of the source node path tracing information based on the HbH-PT.SRC-MCD.TS (e.g., the short timestamp field of the MCD entry associated with the source node from the MCD stack in the HbH-PT header) and the SRH PT-TLV.T64 (e.g., the 64-bit timestamp included in the SRH PT-TLV of the first header). Additionally, or alternatively, the network controller may determine the source node full timestamp of the source node path tracing information based on the HbH-PT.SRC-MCD.TS (e.g., the short timestamp field of the MCD entry associated with the source node from the MCD stack in the HbH-PT header) and the DOH.T64 (e.g., the 64-bit timestamp included in the DOH of the first header). That is, the network controller may determine the source node full timestamp by leveraging a portion of the 64-bit timestamp representing the first time at which the CPU of the source node generated the probe packet and the short timestamp representing the second time at which the NPU of the source node generated the MCD. In some examples, the network controller may leverage the seconds portion of the 64-bit timestamp (e.g., the first 32 bits) and append the short timestamp representing the nanoseconds portion to generate the source node full timestamp.

With the source node path tracing information determined, at 520, the method 500 may include writing the source node path tracing information into a timeseries database managed by the network controller.

In examples where the network controller does not identify the source node in the lookup table, at 522, the method 500 may include setting the source node outgoing interface of the source node path tracing information as the SRH PT-TLV.OIF (e.g., the outgoing interface field of the SRH PT-TLV in the second header of the path tracing probe packet).

At 524, the method 500 may include setting the source node load as the SRH PT-TLV.Load (e.g., the outgoing interface load field of the SRH PT-TLV in the second header of the path tracing probe packet).

At 526, the method 500 may include setting the source node full timestamp as the SRH PT-TLV.T64 (e.g., the 64-bit timestamp field of the SRH PT-TLV in the second header of the path tracing probe packet).

In some examples, the network controller may set the source node outgoing interface of the source node path tracing information as the DOH.OIF (e.g., the outgoing interface field of the DOH in the second header of the path tracing probe packet), the source node load as the DOH.IF_LD (e.g., the outgoing interface load field of the DOH in the second header of the path tracing probe packet), and/or the source node full timestamp as the DOH.T64 (e.g., the 64-bit timestamp field of the SRH PT-TLV in the second header of the path tracing probe packet).

With the source node path tracing information determined, at 520, the method 500 may include writing the source node path tracing information into a timeseries database managed by the network controller.

Figure 6:
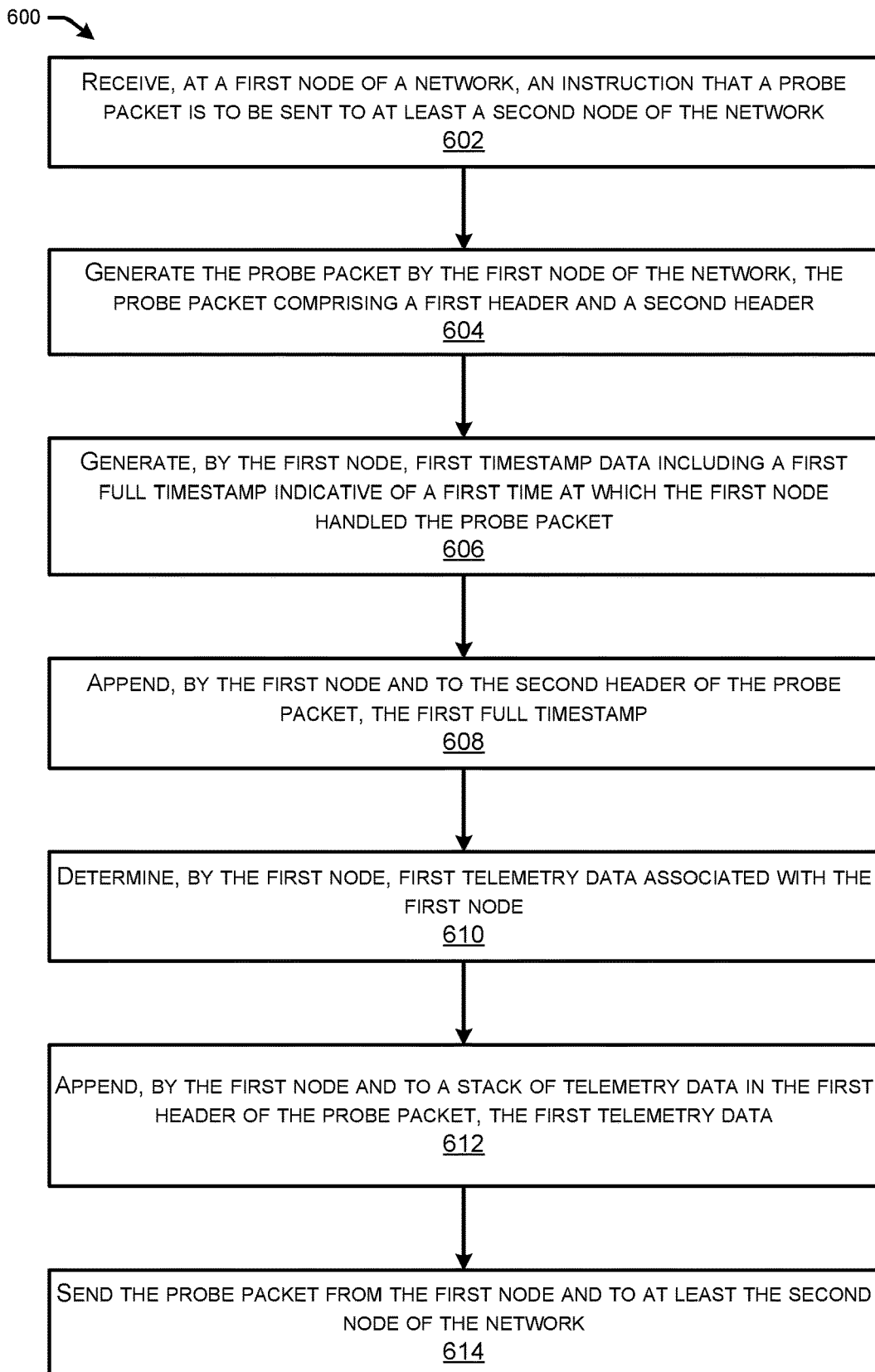
FIG. 6 illustrates a flow diagram of an example method for a source node of a network to generate a probe packet and append telemetry data to various headers of a packet according to one or more specific capabilities and/or optimized behavior(s) described herein.

FIG. 6 illustrates a flow diagram of an example method 600 for a source node of a network to generate a probe packet and append telemetry data to various headers of a packet according to one or more specific capabilities and/or optimized behavior(s) described herein. In some examples, the source node, the network, and/or the probe packet may correspond to the source node 128, the network 102, and/or the probe packet 136 as described with respect to FIG. 1. Additionally, or alternatively, the probe packet may comprise a format according to any of the probe packets 200, 220, 230 as illustrated with respect to FIGS. 2A-2C.

At 602, the method 600 includes receiving, at a first node of a network, an instruction that a probe packet is to be sent to at least a second node of the network. In some examples, the first node may be configured the source node 128 and/or the second node may be configured as the sink node 132 as described with respect to FIG. 1.

At 604, the method 600 includes generating the probe packet by the first node of the network. In some examples, the probe packet may comprise a first header at a first depth in the probe packet. Additionally, or alternatively, the probe packet may comprise a second header at a second depth in the probe packet. In some examples, the second depth may be deeper in the probe packet than the first depth. In some examples, the first header may correspond to the second header 204 as described with respect to FIGS. 2A-2C. Additionally, or alternatively, the second header may correspond to the fourth header 208 as described with respect to FIG. 2A and/or the fifth header 222 as described with respect to FIGS. 2B and 2C.

At 606, the method 600 includes generating, by the first node, first timestamp data including a first full timestamp indicative of a first time at which the first node handled the probe packet.

At 608, the method 600 includes appending, by the first node and to the second header of the probe packet, the first full timestamp. In some examples, the first full timestamp may be appended to the 64-bit transmit timestamp of the source node 218 as described with respect to FIGS. 2A-2C.

At 610, the method 600 includes determining, by the first node, first telemetry data associated with the first node. In some examples, the first telemetry data may comprise a short timestamp representing a portion of a second full timestamp that is indicative of a second time at which the first node handled the probe packet. In some examples, the second time may be subsequent to the first time. Additionally, or alternatively, the first telemetry data may comprise an interface identifier associated with the first node. Additionally, or alternatively, the first telemetry data may comprise an interface load associated with the first node.

At 612, the method 600 includes appending, by the first node and to a stack of telemetry data in the first header of the probe packet, the first telemetry data. In some examples, the stack of telemetry data may correspond to the MCD stack 216 as described with respect to FIGS. 2A-2C.

At 614, the method 600 includes sending the probe packet from the first node and to at least the second node of the network.

Additionally, or alternatively, the method 600 includes determining that the second depth in the probe packet exceeds a threshold edit depth of an application-specific integrated circuit (ASIC) included in the first node. Additionally, or alternatively, appending the first full timestamp to the second header of the probe packet may be based at least in part on determining that the second depth in the probe packet exceeds the threshold edit depth of the ASIC.

In some examples, the portion of the second full timestamp may be a first portion representing nanoseconds (ns). Additionally, or alternatively, the method 600 may include determining that an application-specific integrated circuit (ASIC) included in the first node is denied access to a second portion of the second full timestamp representing seconds. Additionally, or alternatively, appending the first telemetry data to the stack of telemetry data may be based at least in part on determining that the ASIC is denied access to the second portion of the second full timestamp.

In some examples, a flow for sending the probe packet through the network between the first node and the second node may comprise one or more third nodes. In some examples, the one or more third nodes may correspond to the intermediate nodes 130 as described with respect to FIG. 1.

In some examples, the stack of telemetry data may comprise second telemetry data corresponding to individual ones of the one or more third nodes based at least in part on sending the probe packet from the first node and to at least the second node.

In some examples, the probe packet may be a first probe packet. Additionally, or alternatively, the method 600 includes generating, by the first node, a second probe packet. Additionally, or alternatively, the method 600 includes sending the probe packet from the first node and to at least the second node of the network using a first flow that is different from a second flow used to send the first probe packet to at least the second node.

In some examples, the interface load associated with the first node includes at least one of equal-cost multipath analytics associated with the first node, network function virtualization (NFV) chain proof of transit associated with the first node, a latency measurement associated with the first node, and/or a jitter measurement associated with the first node.

Figure 7:
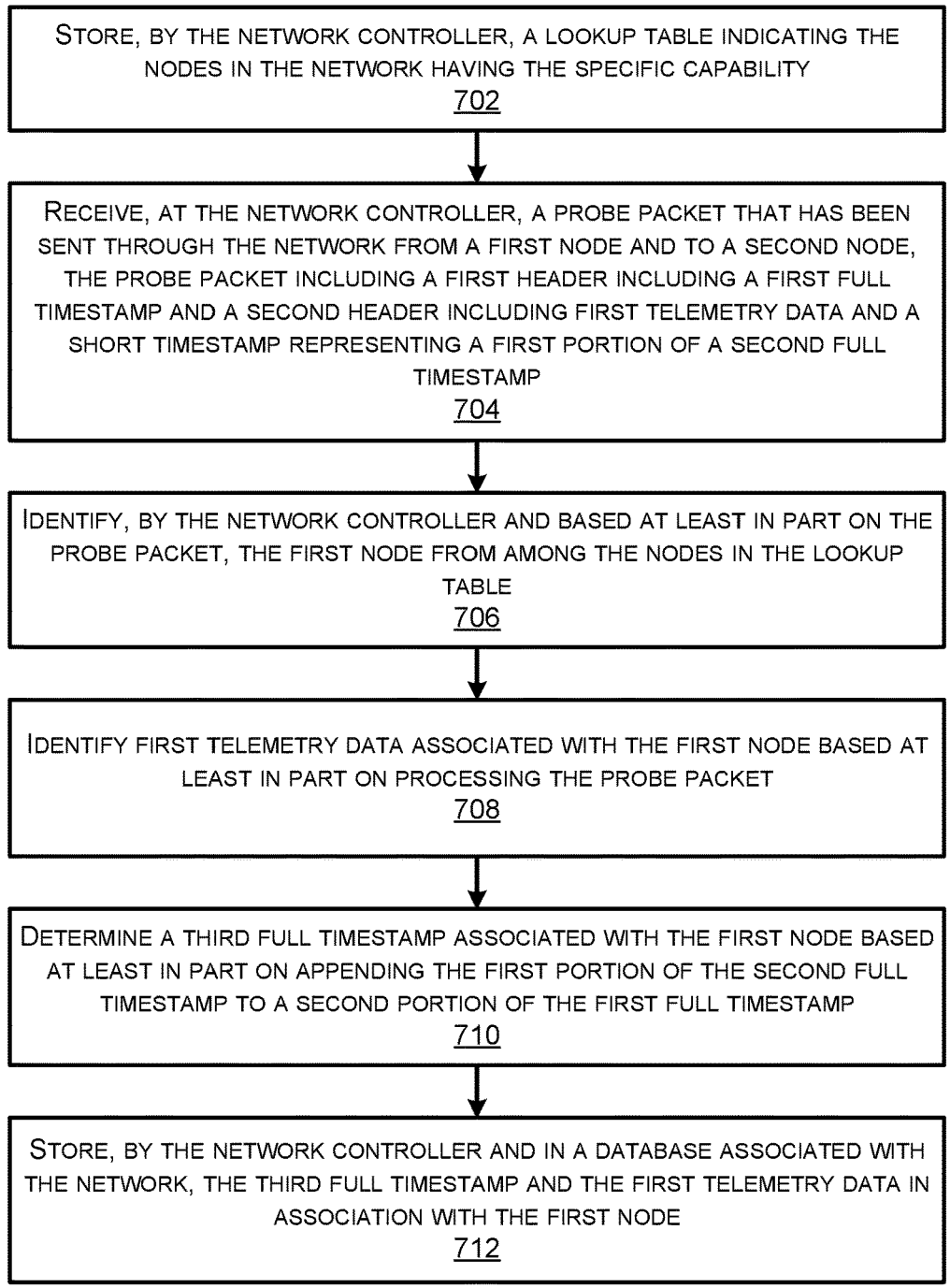
FIG. 7 illustrates a flow diagram of an example method for a network controller associated with a network to receive a probe packet that has been sent through the network from a source node, determine that the source node comprises a specific capability and/or an optimized behavior, and combining data stored in various headers to determine a full timestamp representative of the source node comprising the specific capability handling the probe packet.

FIG. 7 illustrates a flow diagram of an example method 700 for a network controller associated with a network to receive a probe packet that has been sent through the network from a source node, determine that the source node comprises a specific capability and/or an optimized behavior, and combining data stored in various headers to determine a full timestamp representative of the source node comprising the specific capability handling the probe packet. In some examples, the network controller, the network, the probe packet, and/or the source node may correspond to the network controller 110, the network 102, the probe packet 136, and/or the source node 128 as described with respect to FIG. 1. Additionally, or alternatively, the probe packet may comprise a format according to any of the probe packets 200, 220, 230 as illustrated with respect to FIGS. 2A-2C.

At 702, the method 700 includes storing, by a network controller associated with a network, a lookup table indicating nodes in the network having a specific capability.

At 704, the method 700 includes receiving, at the network controller, a probe packet that has been sent through the network from a first node and to a second node. In some examples, the first node may correspond to the source node 128 and/or the second node may correspond to the sink node 132 as described with respect to FIG. 1. In some examples, the probe packet may comprise a first header at a first depth in the probe packet. In some examples, the first header may include a first full timestamp indicative of a first time at which the first node handled the probe packet. Additionally, or alternatively, the probe packet may comprise a second header at a second depth in the probe packet that is shallower than the first depth. In some examples, the second header may include at least first telemetry data comprising a short timestamp representing a first portion of a second full timestamp indicative of a second time at which the first node handled the probe packet. In some examples, the second time may be subsequent to the first time. In some examples, the first header may correspond to the fourth header 208 as described with respect to FIG. 2A and/or the fifth header 222 as described with respect to FIGS. 2B and 2C. Additionally, or alternatively, the second header may correspond to the second header 204 as described with respect to FIGS. 2A-2C.

At 706, the method 700 includes identifying, by the network controller and based at least in part on the probe packet, the first node from among the nodes in the lookup table.

At 708, the method 700 includes identifying the first telemetry data associated with the first node based at least in part on processing the probe packet.

At 710, the method 700 includes determining a third full timestamp associated with the first node based at least in part on appending the first portion of the second full timestamp to a second portion of the first full timestamp.

At 712, the method 700 includes storing, by the network controller and in a database associated with the network, the third full timestamp and the first telemetry data in association with the first node. In some examples, the database may correspond to the timeseries database 114.

In some examples, the second header may comprise a stack of telemetry data including the first telemetry data. In some examples, the stack of telemetry data may correspond to the MCD stack 216 as described with respect to FIGS. 2A-2C. Additionally, or alternatively, the method 700 includes identifying, in the stack of telemetry data, second telemetry data associated with the second node. Additionally, or alternatively, the method 700 includes determining, based at least in part on the second telemetry data, a flow through which the probe packet was sent from the first node to the second node. In some examples, the flow may indicate one or more third nodes that handled the probe packet. Additionally, or alternatively, the method 700 includes determining, based at least in part on the second telemetry data, a fourth full timestamp indicative of a third time at which the second node handled the probe packet. Additionally, or alternatively, the method 700 includes determining, based at least in part on the third full timestamp and the fourth full timestamp, a latency associated with the flow. Additionally, or alternatively, the method 700 includes storing, by the network controller and in the database associated with the network, the latency in association with the flow.

In some examples, the first portion of the second full timestamp may comprise nanoseconds (ns) and/or the second portion of the first full timestamp comprises seconds.

In some examples, the first telemetry data may include an interface load associated with the first node. In some examples, the interface load may comprise at least one of equal-cost multipath analytics associated with the first node, network function virtualization (NFV) chain proof of transit associated with the first node, a latency measurement associated with the first node, and/or a jitter measurement associated with the first node.

In some examples, the probe packet may be a first probe packet. Additionally, or alternatively, the method 700 includes receiving, at the network controller, a second probe packet that has been sent through the network from a third node and to the second node. Additionally, or alternatively, the method 700 includes determining that the third node is absent in the lookup table. Additionally, or alternatively, the method 700 includes identifying, in the first header of the second probe packet, a fourth full timestamp indicative of a fourth time at which the third node handled the probe packet. Additionally, or alternatively, the method 700 includes identifying, in the second header of the second probe packet, second telemetry data associated with the second node and one or more third nodes in the network. Additionally, or alternatively, the method 700 includes storing, by the network controller and in the database associated with the network, the fourth full timestamp and the second telemetry data in association with the third node.

Additionally, or alternatively, the method 700 includes receiving, at the network controller and at a third time that is prior to the first time, second telemetry data associated with the nodes in the network. In some examples, the second telemetry data may indicate the nodes having a specific capability. Additionally, or alternatively, the method 700 includes generating, by the network controller and based at least in part on the first telemetry data, the lookup table.

Figure 8:
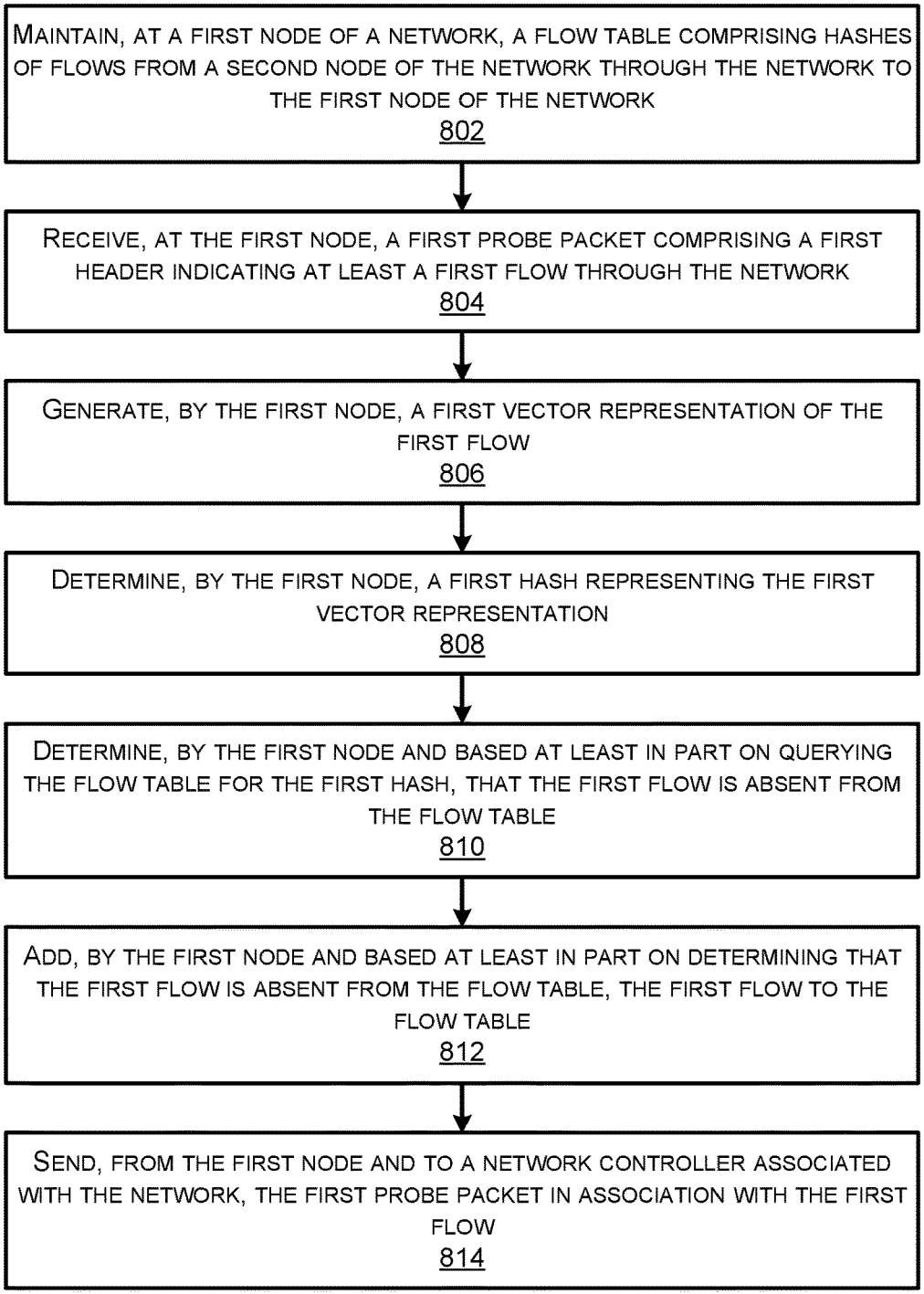
FIG. 8 illustrates a flow diagram of an example method for a sink node of a network to receive a probe packet, generate a vector representation of the probe packet, determine a hash of the vector representation, and determine whether a flow through the network corresponding to the probe packet exists based on querying, a flow table comprising hashes of the flows through the network, for the hash of the vector representation of the probe packet.

FIG. 8 illustrates a flow diagram of an example method 800 for a sink node of a network to receive a probe packet, generate a vector representation of the probe packet, determine a hash of the vector representation, and determine whether a flow through the network corresponding to the probe packet exists based on querying, a flow table comprising hashes of the flows through the network, for the hash of the vector representation of the probe packet. In some examples, the sink node, the network, and/or the probe packet may correspond to the sink node 132, the network 102, and/or the probe packet 136 as described with respect to FIG. 1. Additionally, or alternatively, the probe packet may comprise a format according to any of the probe packets 200, 220, 230 as illustrated with respect to FIGS. 2A-2C.

At 802, the method 800 includes maintaining, at a first node of a network, a flow table comprising hashes of flows from a second node of the network through the network to the first node of the network. In some examples, the first node may correspond to the sink node 132 and/or the second node may correspond to the source node 128 as described with respect to FIG. 1.

At 804, the method 800 includes receiving, at the first node, a first probe packet comprising a first header indicating at least a first flow through the network. In some examples, the first header may correspond to the second header 204 as described with respect to FIGS. 2A-2C.

At 806, the method 800 includes generating, by the first node, a first vector representation of the first flow. In some examples, the first vector representation may be based at least in part on interfaces associated with the source node and/or the intermediate nodes in the network, such as, for example, intermediate nodes 130 as described with respect to FIG. 1.

At 808, the method 800 includes determining, by the first node, a first hash representing the first vector representation.

At 810, the method 800 includes determining, by the first node and based at least in part on querying the flow table for the first hash, that the first flow is absent from the flow table.

At 812, the method 800 includes adding, by the first node and based at least in part on determining that the first flow is absent from the flow table, the first flow to the flow table.

At 814, the method 800 includes sending, from the first node and to a network controller associated with the network, the first probe packet in association with the first flow Additionally, or alternatively, the method 800 includes determining, by the first node and based at least in part on the first header, a first latency value associated with the first flow. Additionally, or alternatively, the method 800 includes identifying, by the first node and based at least in part on the first flow, a latency database stored in association with the first node, the latency database comprising one or more latency bins representing a latency distribution associated with the network. Additionally, or alternatively, the method 800 includes storing, by the first node, the first flow and the first latency value in a first latency bin of the latency database based at least in part on the first latency value. Additionally, or alternatively, the method 800 includes determining that a period of time has lapsed. Additionally, or alternatively, the method 800 includes based at least in part on determining that the period of time has lapsed, sending from the first node and to the network controller, data representing the latency distribution.

Additionally, or alternatively, the method 800 includes generating, by the first node, first timestamp data including a first full timestamp indicative of a first time at which the first node received the first probe packet. Additionally, or alternatively, the method 800 includes identifying, by the first node and in the first header, a stack of telemetry data associated with the first flow. Additionally, or alternatively, the method 800 includes identifying, based at least in part on the stack of telemetry data, a second node as a source of the first flow. In some examples, the second node may be associated with first telemetry data of the stack of telemetry data. Additionally, or alternatively, the method 800 includes determining, based at least in part on the first telemetry data, a second full timestamp indicative of a second time at which the second node handled the first probe packet. In some examples, the second time may be prior to the first time. Additionally, or alternatively, the method 800 includes determining a first latency value associated with the first flow based at least in part on the first full timestamp and the second full timestamp.

In some examples, the flows from the second node through the network to the first node may comprise one or more third nodes. In some examples, the one or more third nodes may correspond to the intermediate nodes 130 as described with respect to FIG. 1.

In some examples, the first probe packet may include a flow label indicating an equal-cost multipath (ECMP) identifier representing the first flow.

In some examples, the first probe packet may include a flow label that was randomly generated by the second node configured as a source of the first flow.

Additionally, or alternatively, the method 800 includes identifying, by the first node, telemetry data included in the first header. Additionally, or alternatively, the method 800 includes determining, based at least in part on the telemetry data, one or more interface identifiers associated with the first flow. In some examples, the one or more interface identifiers may be associated with one or more third nodes in the network. Additionally, or alternatively, the method 800 includes determining, based at least in part on the one or more interface identifiers, an equal-cost multipath (EMCP) identifier associated with the first flow. Additionally, or alternatively, the method 800 includes sending, from the first node and to the network controller, the ECMP identifier in association with the first probe packet and the first flow.

Additionally, or alternatively, the method 800 includes receiving, at the first node, a second probe packet comprising a second header indicating at least a second flow through the network. Additionally, or alternatively, the method 800 includes generating, by the first node, a second vector representation of the second flow. Additionally, or alternatively, the method 800 includes determining, by the first node, a second hash representing the second vector representation. Additionally, or alternatively, the method 800 includes determining, by the first node and based at least in part on querying the flow table for the second hash, that the second flow exists in the flow table. Additionally, or alternatively, the method 800 includes discarding the second probe packet.

FIG. 9 illustrates a flow diagram of an example method 900 for a network controller associated with a network to send an instruction to a source node to begin a path tracing sequence associated with flows in the network, determine a packet loss associated with the flows in the network, determine a latency distribution associated with the flows in the network, and store the packet loss and latency distribution in association with the flows. In some examples, the network controller, the network, and/or the source node may correspond to the network controller 110, the network 102, and/or the source node 128 as described with respect to FIG. 1.

At 902, the method 900 includes sending, from a network controller associated with a network and to a first node of the network, an instruction to send first probe packets from the first node and to at least a second node of the network. In some examples, the first node may correspond to the source node 128 and/or the second node may correspond to the sink node 132 as described with respect to FIG. 1. Additionally, or alternatively, the first probe packets may correspond to the probe packet 136 as described with respect to FIG. 1. Additionally, or alternatively, the first probe packets may comprise a format according to any of the probe packets 200, 220, 230 as illustrated with respect to FIGS. 2A-2C.

At 904, the method 900 includes receiving, at the network controller and from the first node, a first counter indicating a first number of the first probe packets.

At 906, the method 900 includes receiving, at the network controller and from the second node, a second counter indicating a second number of second probe packets that the second node stored in one or more bins of a database associated with the second node. In some examples, the one or more bins may correspond to the latency bin(s) 134 as described with respect to FIG. 1.

At 908, the method 900 includes determining, by the network controller, a packet loss associated with flows in the network based at least in part on the first counter and the second counter.

At 910, the method 900 includes determining, by the network controller, a latency distribution associated with the flows in the network based at least in part on the one or more bins that the second probe packets are stored in. In some examples, the network controller may receive telemetry data from the second node representing the probe packets stored in the one or more bins. Additionally, or alternatively, the network controller may determine the latency distribution based at least in part on the telemetry data.

At 912, the method 900 includes storing, by the network controller and in the database, the packet loss and/or the latency distribution in association with the flows in the network.

Additionally, or alternatively, the method 900 includes receiving, at the network controller and from the second node, latency data representing individual ones of the second probe packets in the one or more bins of the database. Additionally, or alternatively, the method 900 includes determining the latency distribution associated with the network based at least in part on the latency data associated with the second probe packets and the second number of the second probe packets. Additionally, or alternatively, the method 900 includes storing, by the network controller and in the database, the latency distribution in association with the network.

Additionally, or alternatively, the method 900 includes generating, by the network controller, a latency histogram associated with the network based at least in part on the latency distribution. In some examples, the latency histogram may represent the latency distribution. Additionally, or alternatively, the method 900 includes generating, by the network controller, a graphical user interface (GUI) configured to display on a computing device. In some examples, the GUI may include at least the latency histogram associated with the network. Additionally, or alternatively, the method 900 includes sending, from the network controller and to the computing device, the GUI.

Additionally, or alternatively, the method 900 includes identifying, for individual ones of the second probe packets stored in the one or more bins, flow labels indicating equal-cost multipath (ECMP) identifiers representing the flows in the network. Additionally, or alternatively, the method 900 includes determining, subgroups of the second probe packets in the one or more bins based at least in part on the ECMP identifiers, a first subgroup being associated with a first number of third nodes in the network. Additionally, or alternatively, the method 900 includes identifying latency data for individual ones of the subgroups, first latency data associated with the first subgroup of the subgroups being based at least in part on telemetry data associated with individual ones of the second probe packets in the first subgroup. Additionally, or alternatively, the method 900 includes determining latency distributions associated with the network for the individual ones of the subgroups, a first latency distribution associated with the first subgroup being based at least in part on the first latency data associated with the second probe packets in the first subgroup and/or the second number of the second probe packets in the first subgroup. Additionally, or alternatively, the method 900 includes storing, by the network controller and in the database, the latency distributions associated with the network in association with the ECMP identifiers of the subgroups.

Additionally, or alternatively, the method 900 includes identifying, for individual ones of the second probe packets stored in the one or more bins, telemetry data indicating interface identifiers associated with third nodes in the network. Additionally, or alternatively, the method 900 includes determining, subgroups of the second probe packets in the one or more bins based at least in part on the interface identifiers, a first subgroup being associated with a first number of the third nodes in the network. Additionally, or alternatively, the method 900 includes identifying latency data for individual ones of the subgroups, first latency data associated with the first subgroup of the subgroups being based at least in part on the telemetry data associated with individual ones of the second probe packets in the first subgroup. Additionally, or alternatively, the method 900 includes determining latency distributions associated with the network for the individual ones of the subgroups, a first latency distribution associated with the first subgroup being based at least in part on the first latency data associated with the second probe packets in the first subgroup and the second number of the second probe packets in the first subgroup. Additionally, or alternatively, the method 900 includes storing, by the network controller and in the database, the latency distributions associated with the network in association with the interface identifiers of the subgroups.

In some examples, the flows from the first node through the network to the second node may comprise one or more third nodes. In some examples, the one or more third nodes may correspond to the intermediate nodes 130 as described with respect to FIG. 1.

Figure 10:
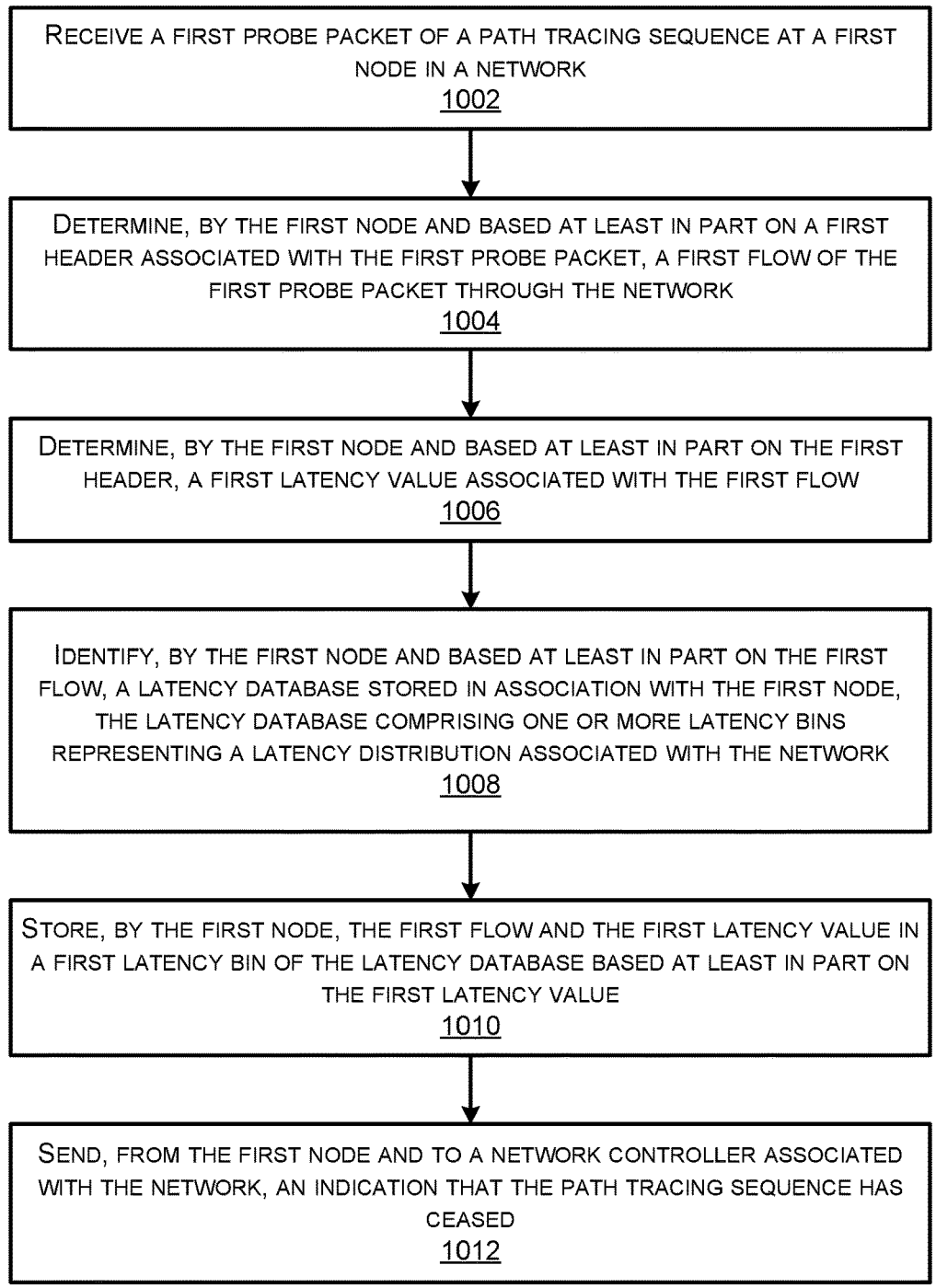
FIG. 10 illustrates a flow diagram of an example method for a sink node of a network to receive a probe packet of a path tracing sequence in the network, determine a latency value associated with a flow of the probe packet through the network, identify a bin of a latency database stored in hardware memory of the sink node and representing a latency distribution of the network, and store the latency value in association with the flow in the corresponding bin.

FIG. 10 illustrates a flow diagram of an example method 1000 for a sink node of a network to receive a probe packet of a path tracing sequence in the network, determine a latency value associated with a flow of the probe packet through the network, identify a bin of a latency database stored in hardware memory of the sink node and representing a latency distribution of the network, and store the latency value in association with the flow in the corresponding bin. In some examples, the sink node, the network, the probe packet, and/or the latency database may correspond to the sink node 132, the network 102, the probe packet 136, and/or the latency bin(s) 134 as described with respect to FIG. 1. Additionally, or alternatively, the probe packet may comprise a format according to any of the probe packets as illustrated with respect to FIGS. 2A-2C.

At 1002, the method 1000 includes receiving a first probe packet of a path tracing sequence at a first node in a network. In some examples, the first node may correspond to the sink node 132 as described with respect to FIG. 1.

At 1004, the method 1000 includes determining, by the first node and based at least in part on a first header associated with the first probe packet, a first flow of the first probe packet through the network. In some examples, the first header may correspond to the second header 204 as described with respect to FIGS. 2A-2C.

At 1006, the method 1000 includes determining, by the first node and based at least in part on the first header, a first latency value associated with the first flow.

At 1008, the method 1000 includes identifying, by the first node and based at least in part on the first flow, a latency database stored in association with the first node. In some examples, the latency database may comprise one or more latency bins representing a latency distribution associated with the network. In some examples, the one or more latency bins may correspond to the latency bin(s) 134 as described with respect to FIG. 1.

At 1010, the method 1000 includes storing, by the first node, the first flow and the first latency value in a first latency bin of the latency database based at least in part on the first latency value.

At 1012, the method 1000 includes sending, from the first node and to a network controller associated with the network, an indication that the path tracing sequence has ceased. In some examples, the network controller may correspond to the network controller 110 as described with respect to FIG. 1.

In some examples, the first probe packet may be sent from a second node configured as a source of the path tracing sequence. In some examples, the second node may correspond to the source node 128 as described with respect to FIG. 1. Additionally, or alternatively, the path tracing sequence may comprise one or more third nodes provisioned along the first flow between the first node and the second node. In some examples, the one or more third nodes may correspond to the intermediate nodes 130 as described with respect to FIG. 1.

In some examples, the first probe packet may include a flow label indicating an equal-cost multipath (ECMP) identifier representing the first flow.

In some examples, the first probe packet may include a flow label that was randomly generated by a second node configured as a source of the first flow.

Additionally, or alternatively, the method 1000 includes identifying, by the first node, telemetry data included in the first header. Additionally, or alternatively, the method 1000 includes determining, based at least in part on the telemetry data, one or more interface identifiers representing the first flow. In some examples, the one or more interface identifiers may be associated with one or more third nodes in the network. Additionally, or alternatively, the method 1000 includes determining, based at least in part on the one or more interface identifiers, an equal-cost multipath (EMCP) identifier associated with the first flow. Additionally, or alternatively, the method 1000 includes storing, by the first node, the ECMP identifier in association with the first flow in the first latency bin of the latency database.

Additionally, or alternatively, the method 1000 includes maintaining, at the first node, a flow table comprising hashes of flow from a second node of the network through the network to the first node of the network. Additionally, or alternatively, the method 1000 includes generating, by the first node, a first vector representation of the first flow. Additionally, or alternatively, the method 1000 includes determining, by the first node, a first hash representing the first vector representation. Additionally, or alternatively, the method 1000 includes determining, by the first node and based at least in part on querying the flow table for the first hash, that the first flow is absent from the flow table. Additionally, or alternatively, the method 1000 includes adding, by the first node and based at least in part on determining that the first flow is absent from the flow table, the first flow to the flow table. In some examples, storing the first flow and the first latency value in the first latency bin of the latency database may be based at least in part on determining that the first flow is absent from the flow table.

Figure 11:
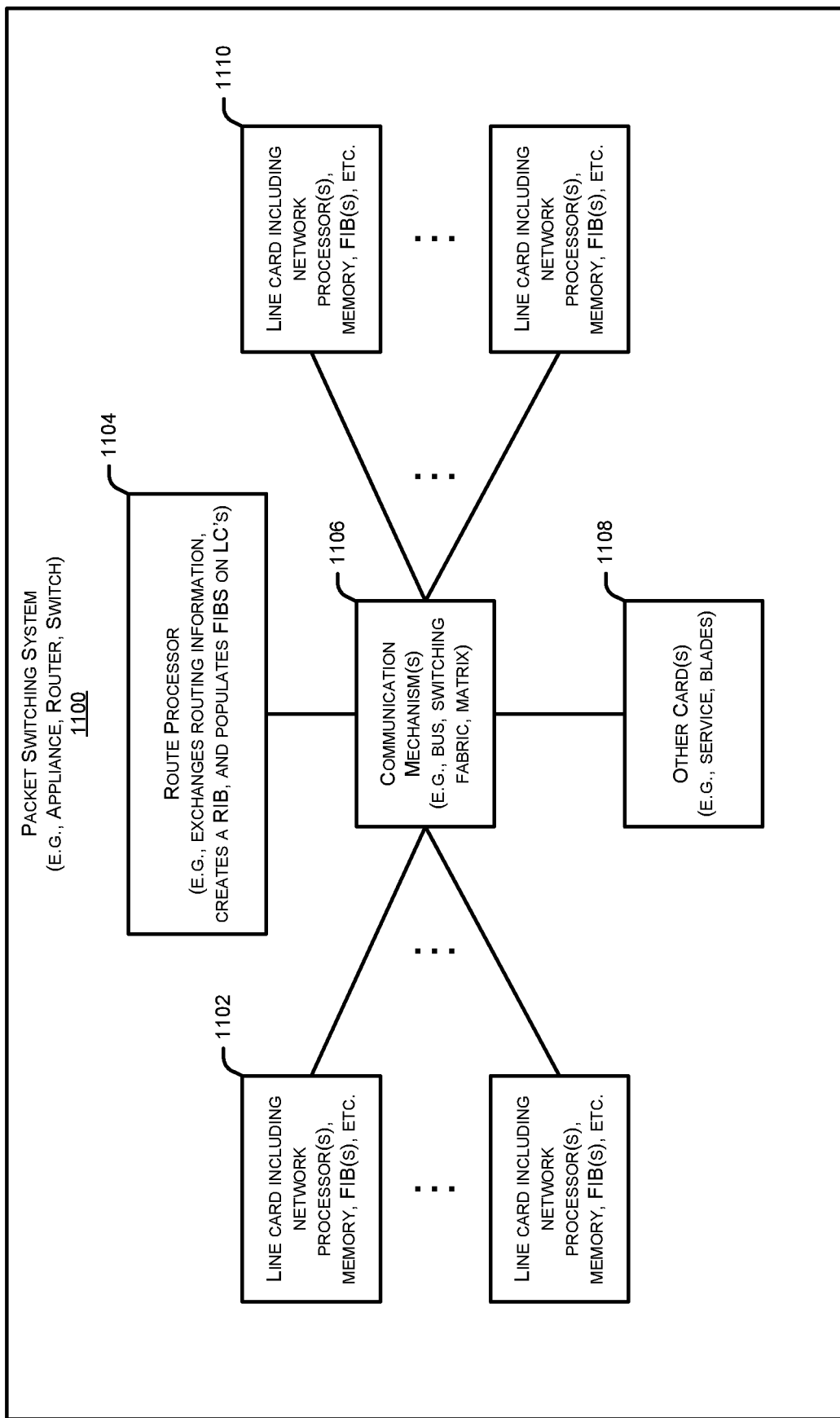
FIG. 11 illustrates a block diagram illustrating an example packet switching system that can be utilized to implement various aspects of the technologies disclosed herein.

FIG. 11 illustrates a block diagram illustrating an example packet switching device (or system) 1100 that can be utilized to implement various aspects of the technologies disclosed herein. In some examples, packet switching device(s) 1100 may be employed in various networks, such as, for example, network 102 as described with respect to FIG. 1.

In some examples, a packet switching device 1100 may comprise multiple line card(s) 1102, 1110, each with one or more network interfaces for sending and receiving packets over communications links (e.g., possibly part of a link aggregation group). The packet switching device 1100 may also have a control plane with one or more processing elements 1104 for managing the control plane and/or control plane processing of packets associated with forwarding of packets in a network. The packet switching device 1100 may also include other cards 1108 (e.g., service cards, blades) which include processing elements that are used to process (e.g., forward/send, drop, manipulate, change, modify, receive, create, duplicate, apply a service) packets associated with forwarding of packets in a network. The packet switching device 1100 may comprise hardware-based communication mechanism 1106 (e.g., bus, switching fabric, and/or matrix, etc.) for allowing its different entities 1102, 1104, 1108 and 1110 to communicate. Line card(s) 1102, 1110 may typically perform the actions of being both an ingress and/or an egress line card 1102, 1110, in regard to multiple other particular packets and/or packet streams being received by, or sent from, packet switching device 1100.

Figure 12:
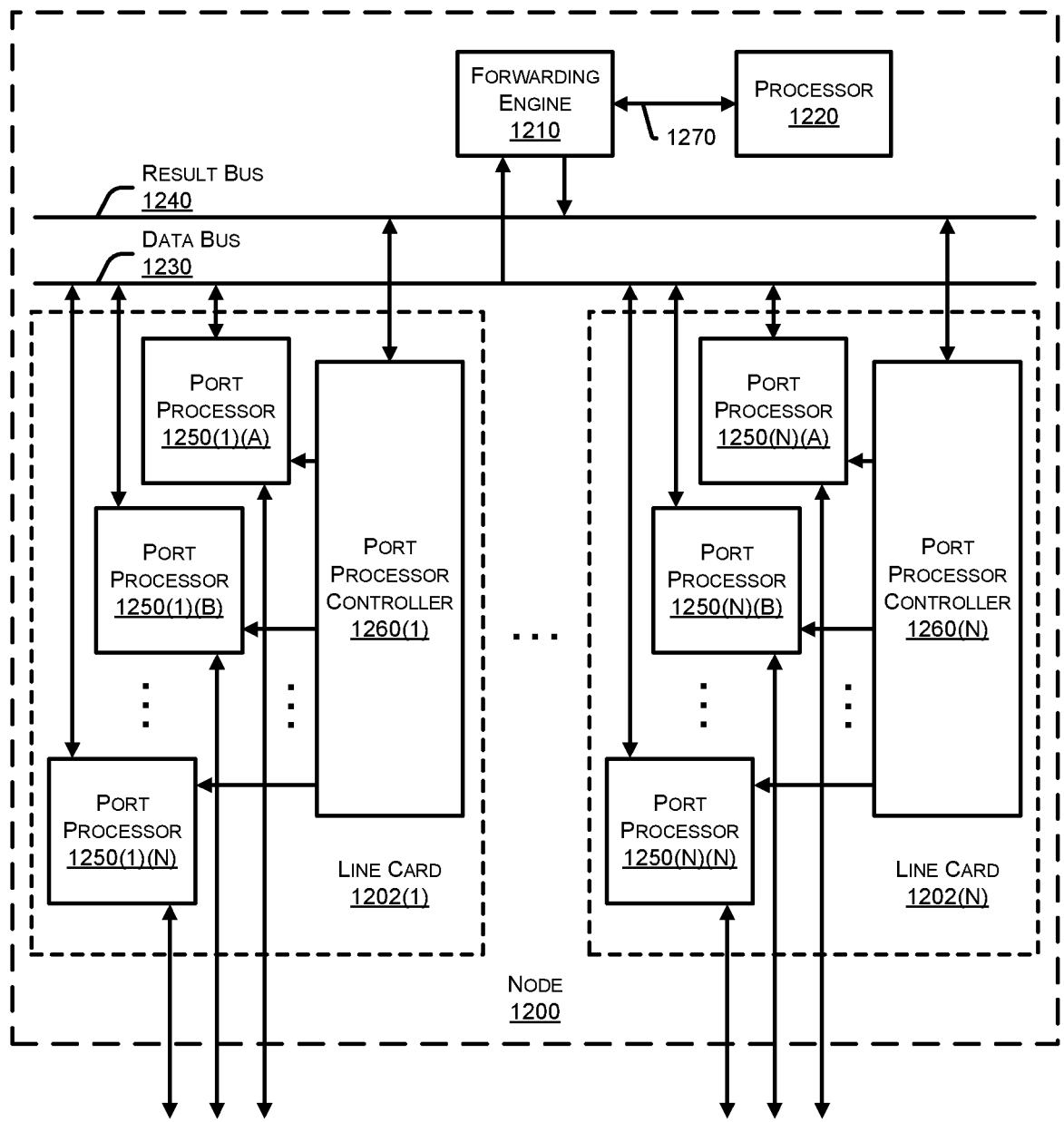
FIG. 12 illustrates a block diagram illustrating certain components of an example node that can be utilized to implement various aspects of the technologies disclosed herein.

FIG. 12 illustrates a block diagram illustrating certain components of an example node 1200 that can be utilized to implement various aspects of the technologies disclosed herein. In some examples, node(s) 1200 may be employed in various networks, such as, for example, network 102 as described with respect to FIG. 1.

In some examples, node 1200 may include any number of line cards 1202 (e.g., line cards 1202(1)-(N), where N may be any integer greater than 1) that are communicatively coupled to a forwarding engine 1210 (also referred to as a packet forwarder) and/or a processor 1220 via a data bus 1230 and/or a result bus 1240. Line cards 1202(1)-(N) may include any number of port processors 1250(1)(A)-(N)(N) which are controlled by port processor controllers 1260(1)-(N), where N may be any integer greater than 1. Additionally, or alternatively, forwarding engine 1210 and/or processor 1220 are not only coupled to one another via the data bus 1230 and the result bus 1240, but may also communicatively coupled to one another by a communications link 1270.

The processors (e.g., the port processor(s) 1250 and/or the port processor controller(s) 1260) of each line card 1202 may be mounted on a single printed circuit board. When a packet or packet and header are received, the packet or packet and header may be identified and analyzed by node 1200 (also referred to herein as a router) in the following manner. Upon receipt, a packet (or some or all of its control information) or packet and header may be sent from one of port processor(s) 1250(1)(A)-(N)(N) at which the packet or packet and header was received and to one or more of those devices coupled to the data bus 830 (e.g., others of the port processor(s) 1250(1)(A)-(N)(N), the forwarding engine 1210 and/or the processor 1220). Handling of the packet or packet and header may be determined, for example, by the forwarding engine 1210. For example, the forwarding engine 1210 may determine that the packet or packet and header should be forwarded to one or more of port processors 1250(1)(A)-(N)(N). This may be accomplished by indicating to corresponding one(s) of port processor controllers 1260(1)-(N) that the copy of the packet or packet and header held in the given one(s) of port processor(s) 1250 (1)(A)-(N)(N) should be forwarded to the appropriate one of port processor(s) 1250(1)(A)-(N)(N). Additionally, or alternatively, once a packet or packet and header has been identified for processing, the forwarding engine 1210, the processor 1220, and/or the like may be used to process the packet or packet and header in some manner and/or maty add packet security information in order to secure the packet. On a node 1200 sourcing such a packet or packet and header, this processing may include, for example, encryption of some or all of the packet's or packet and header's information, the addition of a digital signature, and/or some other information and/or processing capable of securing the packet or packet and header. On a node 1200 receiving such a processed packet or packet and header, the corresponding process may be performed to recover or validate the packet's or packet and header's information that has been secured.

Figure 13:
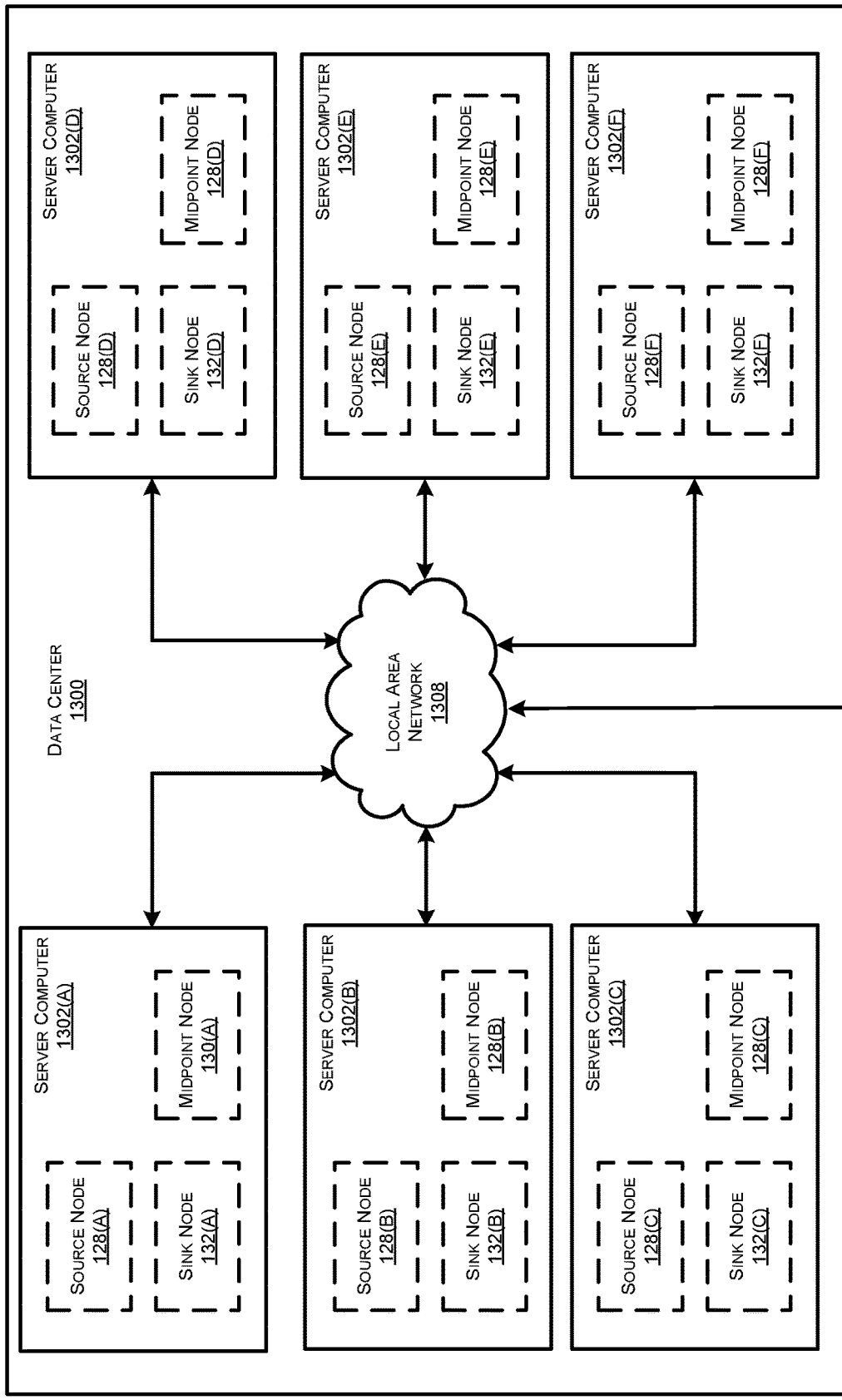
FIG. 13 illustrates a computing system diagram illustrating a configuration for a data center that can be utilized to implement aspects of the technologies disclosed herein.

FIG. 13 is a computing system diagram illustrating a configuration for a data center 1300 that can be utilized to implement aspects of the technologies disclosed herein. The example data center 1300 shown in FIG. 13 includes several server computers 1302A-1302E (which might be referred to herein singularly as "a server computer 1302" or in the plural as "the server computers 1302") for providing computing resources. In some examples, the server computers 1302 may include, or correspond to, the servers associated with the site (or data center) 104, the packet switching system 1100, and/or the node 1200 described herein with respect to FIGS. 1, 11 and 12, respectively.

The server computers 1302 can be standard tower, rackmount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 1302 can also be configured to execute a resource manager capable of instantiating and/or managing the computing resources. In the case of VM instances, for example, the resource manager can be a hypervisor or another type of program configured to enable the execution of multiple VM instances on a single server computer 1302. Server computers 1302 in the data center 1300 can also be configured to provide network services and other types of services.

In the example data center 1300 shown in FIG. 13, an appropriate LAN 1308 is also utilized to interconnect the server computers 1302A-1302E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1300, between each of the server computers 1302A-1302E in each data center 1300, and, potentially, between computing resources in each of the server computers 1302. It should be appreciated that the configuration of the data center 1300 described with reference to FIG. 13 is merely illustrative and that other implementations can be utilized.

In some examples, the server computers 1302 may each execute a source node 128, a midpoint node 130, and/or a sink node 132.

In some instances, the network 102 may provide computing resources, like application containers, VM instances, and storage, on a permanent or an as-needed basis. Among other types of functionality, the computing resources provided by the network 102 may be utilized to implement the various services described above. The computing resources provided by the network 102 can include various types of computing resources, such as data processing resources like application containers and VM instances, data storage resources, networking resources, data communication resources, network services, and the like.

Each type of computing resource provided by the network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network 102 can also be configured to provide other types of computing resources not mentioned specifically herein.

The computing resources provided by the network 102 may be enabled in one embodiment by one or more data centers 1300 (which might be referred to herein singularly as "a data center 1300" or in the plural as "the data centers 1300"). The data centers 1300 are facilities utilized to house and operate computer systems and associated components. The data centers 1300 typically include redundant and backup power, communications, cooling, and security systems. The data centers 1300 can also be located in geographically disparate locations. One illustrative embodiment for a data center 1300 that can be utilized to implement the technologies disclosed herein will be described below with regard to FIG. 14.

Figure 14:
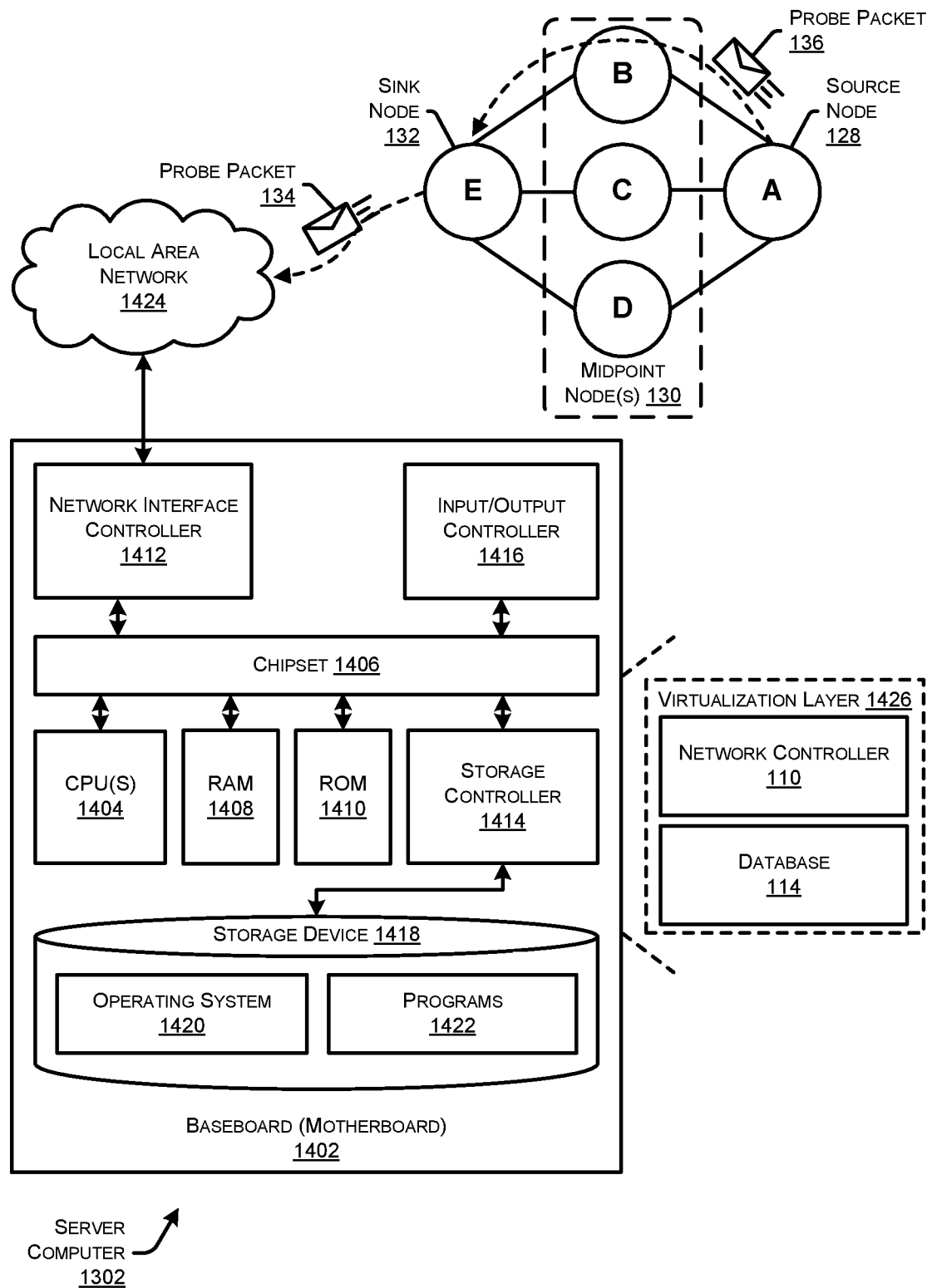
FIG. 14 is a computer architecture diagram showing an illustrative computer hardware architecture for implementing a server device that can be utilized to implement aspects of the various technologies presented herein.

FIG. 14 shows an example computer architecture for a computing device (or network routing device) 1302 capable of executing program components for implementing the functionality described above. The computer architecture shown in FIG. 14 illustrates a conventional server computer, workstation, desktop computer, laptop, tablet, network appliance, e-reader, smartphone, or other computing device, and can be utilized to execute any of the software components presented herein. The computing device 1302 may, in some examples, correspond to a physical server of a data center 104, the packet switching system 1100, and/or the node 1200 described herein with respect to FIGS. 1, 11, and 12, respectively.

The computing device 1302 includes a baseboard 1402, or "motherboard," which is a printed circuit board to which a multitude of components or devices can be connected by way of a system bus or other electrical communication paths. In one illustrative configuration, one or more central processing units ("CPUs") 1404 operate in conjunction with a chipset 1406. The CPUs 1404 can be standard programmable processors that perform arithmetic and logical operations necessary for the operation of the computing device 1302.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 can provide an interface to a RAM 1408, used as the main memory in the computing device 1302. The chipset 1406 can further provide an interface to a computer-readable storage medium such as a read-only memory ("ROM") 1410 or non-volatile RAM ("NVRAM") for storing basic routines that help to startup the computing device 1302 and to transfer information between the various components and devices. The ROM 1410 or NVRAM can also store other software components necessary for the operation of the computing device 1302 in accordance with the configurations described herein.

The computing device 1302 can operate in a networked environment using logical connections to remote computing devices and computer systems through a network, such as the network 1424 (or 1308). The chipset 1406 can include functionality for providing network connectivity through a NIC 1412, such as a gigabit Ethernet adapter. The NIC 1412 is capable of connecting the computing device 1302 to other computing devices over the network 1424. It should be appreciated that multiple NICs 1412 can be present in the computing device 1302, connecting the computer to other types of networks and remote computer systems.

The computing device 1302 can be connected to a storage device 1418 that provides non-volatile storage for the computing device 1302. The storage device 1418 can store an operating system 1420, programs 1422, and data, which have been described in greater detail herein. The storage device 1418 can be connected to the computing device 1302 through a storage controller 1414 connected to the chipset 1406. The storage device 1418 can consist of one or more physical storage units. The storage controller 1414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1302 can store data on the storage device 1418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1418 is characterized as primary or secondary storage, and the like.

For example, the computing device 1302 can store information to the storage device 1418 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1302 can further read information from the storage device 1418 by detecting the physical states or characteristics of one or more particular locations within the physical storage units.

In addition to the mass storage device 1418 described above, the computing device 1302 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1302. In some examples, the operations performed by the computing resource network 102, and or any components included therein, may be supported by one or more devices similar to computing device 1302. Stated otherwise, some or all of the operations performed by the network 102, and or any components included therein, may be performed by one or more computing device 1302 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1418 can store an operating system 1420 utilized to control the operation of the computing device 1302. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1418 can store other system or application programs and data utilized by the computing device 1302.

In one embodiment, the storage device 1418 or other computer-readable storage media is encoded with computer-executable instructions which, when loaded into the computing device 1302, transform the computer from a general-purpose computing system into a special-purpose computer capable of implementing the embodiments described herein. These computer-executable instructions transform the computing device 1302 by specifying how the CPUs 1404 transition between states, as described above. According to one embodiment, the computing device 1302 has access to computer-readable storage media storing computer-executable instructions which, when executed by the computing device 1302, perform the various processes described above with regard to FIGS. 4-10. The computing device 1302 can also include computer-readable storage media having instructions stored thereupon for performing any of the other computer-implemented operations described herein.

The computing device 1302 can also include one or more input/output controllers 1416 for receiving and processing input from a number of input devices, such as a keyboard, a mouse, a touchpad, a touch screen, an electronic stylus, or other type of input device. Similarly, an input/output controller 1416 can provide output to a display, such as a computer monitor, a flat-panel display, a digital projector, a printer, or other type of output device. It will be appreciated that the computing device 1302 might not include all of the components shown in FIG. 14, can include other components that are not explicitly shown in FIG. 14, or might utilize an architecture completely different than that shown in FIG. 14.

The server computer 1302 may support a virtualization layer 1426, such as one or more components associated with the network 102, such as, for example, the network controller 110 and/or all of its components as described with respect to FIG. 1, such as, for example, the database 114. A source node 128 may generate and send probe packet(s) 136 through the network 102 via one or more midpoint node(s) 130 and to a sink node 132. The probe packet(s) 136 may correspond to any one of the probe packet(s) 200, 220, 230 as described with respect to FIGS. 2A, 2B, and/or 2C. The sink node 132 may send the probe packet(s) 136 to the network controller. Additionally, the source node 128, the sink node 132, and/or the network controller 110 may be configured to perform the various operations described herein with respect to FIGS. 1 and 4-10.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   maintaining, at a first node of a network, a flow table comprising hashes of flows from a second node of the network through the network to the first node of the network;
   receiving, at the first node, a first probe packet comprising a first header indicating at least a first flow through the network;
   generating, by the first node, a first vector representation of the first flow;
   determining, by the first node, a first hash representing the first vector representation;
   determining, by the first node and based at least in part on querying the flow table for the first hash, that the first flow is absent from the flow table;
   adding, by the first node and based at least in part on determining that the first flow is absent from the flow table, the first flow to the flow table; and
   sending, from the first node and to a network controller associated with the network, the first probe packet in association with the first flow.

2. The method of claim 1, further comprising:
   determining, by the first node and based at least in part on the first header, a first latency value associated with the first flow;
   identifying, by the first node and based at least in part on the first flow, a latency database stored in association with the first node, the latency database comprising one or more latency bins representing a latency distribution associated with the network;
   storing, by the first node, the first flow and the first latency value in a first latency bin of the latency database based at least in part on the first latency value;
   determining that a period of time has lapsed; and
   based at least in part on determining that the period of time has lapsed, sending from the first node and to the network controller, data representing the latency distribution.

3. The method of claim 1, further comprising:
   generating, by the first node, first timestamp data including a first full timestamp indicative of a first time at which the first node received the first probe packet;
   identifying, by the first node and in the first header, a stack of telemetry data associated with the first flow;
   identifying, based at least in part on the stack of telemetry data, a second node as a source of the first flow, the second node being associated with first telemetry data of the stack of telemetry data;
   determining, based at least in part on the first telemetry data, a second full timestamp indicative of a second time at which the second node handled the first probe packet, the second time being prior to the first time; and
   determining a first latency value associated with the first flow based at least in part on the first full timestamp and the second full timestamp.

4. The method of claim 1, wherein the flows from the second node through the network to the first node comprise one or more third nodes.

5. The method of claim 1, wherein the first probe packet includes a flow label indicating an equal-cost multipath (ECMP) identifier representing the first flow.

6. The method of claim 1, wherein the first probe packet includes a flow label that was randomly generated by the second node configured as a source of the first flow.

7. The method of claim 1, further comprising:
   identifying, by the first node, telemetry data included in the first header;
   determining, based at least in part on the telemetry data, one or more interface identifiers associated with the first flow, the one or more interface identifiers being associated with one or more third nodes in the network;

determining, based at least in part on the one or more interface identifiers, an equal-cost multipath (EMCP) identifier associated with the first flow; and sending, from the first node and to the network controller, the ECMP identifier in association with the first probe packet and the first flow.

8. The method of claim 1, further comprising:

receiving, at the first node, a second probe packet comprising a second header indicating at least a second flow through the network;

generating, by the first node, a second vector representation of the second flow;

determining, by the first node, a second hash representing the second vector representation;

determining, by the first node and based at least in part on querying the flow table for the second hash, that the second flow exists in the flow table; and discarding the second probe packet.

9. A system comprising:

one or more processors; and one or more computer-readable media storing computer-executable instructions that, when executed by the one or more processors, cause the one or more processors to perform operations comprising:

sending, from a network controller associated with a network and to a first node of the network, an instruction to send first probe packets from the first node and to at least a second node of the network;

receiving, at the network controller and from the first node, a first counter indicating a first number of the first probe packets;

receiving, at the network controller and from the second node, a second counter indicating a second number of second probe packets that the second node stored in one or more bins of a database associated with the second node;

determining, by the network controller, a packet loss associated with flows in the network based at least in part on the first counter and the second counter;

determining, by the network controller, a latency distribution associated with the flows in the network based at least in part on the one or more bins that the second probe packets are stored in; and storing, by the network controller and in the database, the packet loss and the latency distribution in association with the flows in the network.

10. The system of claim 9, the operations further comprising:

receiving, at the network controller and from the second node, latency data representing individual ones of the second probe packets in the one or more bins of the database;

determining the latency distribution associated with the network based at least in part on the latency data associated with the second probe packets and the second number of the second probe packets; and storing, by the network controller and in the database, the latency distribution in association with the network.

11. The system of claim 10, the operations further comprising:

generating, by the network controller, a latency histogram associated with the network based at least in part on the latency distribution, the latency histogram representing the latency distribution;

generating, by the network controller, a graphical user interface (GUI) configured to display on a computing device, the GUI including at least the latency histogram associated with the network; and sending, from the network controller and to the computing device, the GUI.

12. The system of claim 9, the operations further comprising:

identifying, for individual ones of the second probe packets stored in the one or more bins, flow labels indicating equal-cost multipath (ECMP) identifiers representing the flows in the network;

determining, subgroups of the second probe packets in the one or more bins based at least in part on the ECMP identifiers, a first subgroup being associated with a first number of third nodes in the network;

identifying latency data for individual ones of the subgroups, first latency data associated with the first subgroup of the subgroups being based at least in part on telemetry data associated with individual ones of the second probe packets in the first subgroup;

determining latency distributions associated with the network for the individual ones of the subgroups, a first latency distribution associated with the first subgroup being based at least in part on the first latency data associated with the second probe packets in the first subgroup and the second number of the second probe packets in the first subgroup; and storing, by the network controller and in the database, the latency distributions associated with the network in association with the ECMP identifiers of the subgroups.

13. The system of claim 9, the operations further comprising:

identifying, for individual ones of the second probe packets stored in the one or more bins, telemetry data indicating interface identifiers associated with third nodes in the network;

determining, subgroups of the second probe packets in the one or more bins based at least in part on the interface identifiers, a first subgroup being associated with a first number of the third nodes in the network;

identifying latency data for individual ones of the subgroups, first latency data associated with the first subgroup of the subgroups being based at least in part on the telemetry data associated with individual ones of the second probe packets in the first subgroup;

determining latency distributions associated with the network for the individual ones of the subgroups, a first latency distribution associated with the first subgroup being based at least in part on the first latency data associated with the second probe packets in the first subgroup and the second number of the second probe packets in the first subgroup; and storing, by the network controller and in the database, the latency distributions associated with the network in association with the interface identifiers of the subgroups.

14. The system of claim 9, wherein the flows from the first node through the network to the second node comprise one or more third nodes.

15. A method comprising:

receiving a first probe packet of a path tracing sequence at a first node in a network;

determining, by the first node and based at least in part on a first header associated with the first probe packet, a first flow of the first probe packet through the network;

determining, by the first node and based at least in part on the first header, a first latency value associated with the first flow;

identifying, by the first node and based at least in part on the first flow, a latency database stored in association with the first node, the latency database comprising one or more latency bins representing a latency distribution associated with the network;

storing, by the first node, the first flow and the first latency value in a first latency bin of the latency database based at least in part on the first latency value; and sending, from the first node and to a network controller associated with the network, an indication that the path tracing sequence has ceased.

16. The method of claim 15, wherein the first probe packet is sent from a second node configured as a source of the path tracing sequence, and the path tracing sequence further comprising one or more third nodes provisioned along the first flow between the first node and the second node.

17. The method of claim 15, wherein the first probe packet includes a flow label indicating an equal-cost multipath (ECMP) identifier representing the first flow.

18. The method of claim 17, wherein the first probe packet includes a flow label that was randomly generated by a second node configured as a source of the first flow.

19. The method of claim 15, further comprising:

identifying, by the first node, telemetry data included in the first header;

determining, based at least in part on the telemetry data, one or more interface identifiers representing the first flow, the one or more interface identifiers being associated with one or more third nodes in the network;

determining, based at least in part on the one or more interface identifiers, an equal-cost multipath (EMCP) identifier associated with the first flow; and storing, by the first node, the ECMP identifier in association with the first flow in the first latency bin of the latency database.

20. The method of claim 15, further comprising:

maintaining, at the first node, a flow table comprising hashes of flow from a second node of the network through the network to the first node of the network;

generating, by the first node, a first vector representation of the first flow;

determining, by the first node, a first hash representing the first vector representation;

determining, by the first node and based at least in part on querying the flow table for the first hash, that the first flow is absent from the flow table;

adding, by the first node and based at least in part on determining that the first flow is absent from the flow table, the first flow to the flow table; and wherein storing the first flow and the first latency value in the first latency bin of the latency database is based at least in part on determining that the first flow is absent from the flow table.

* * * * *